(12) United States Patent
Nakamura

(10) Patent No.: US 9,356,477 B2
(45) Date of Patent: May 31, 2016

(54) ROTATION ASSISTANCE MECHANISM AND ROTATING POWER MECHANISM EQUIPPED WITH SAME

(71) Applicant: Kazuhiko Nakamura, Chiba (JP)

(72) Inventor: Kazuhiko Nakamura, Chiba (JP)

( * ) Notice: Subject to any disclaimer, the term of this patent is extended or adjusted under 35 U.S.C. 154(b) by 0 days.

(21) Appl. No.: 14/424,325

(22) PCT Filed: Aug. 23, 2013

(86) PCT No.: PCT/JP2013/072600
§ 371 (c)(1),
(2) Date: Feb. 26, 2015

(87) PCT Pub. No.: WO2014/034570
PCT Pub. Date: Mar. 6, 2014

(65) Prior Publication Data
US 2015/0222149 A1 Aug. 6, 2015

(30) Foreign Application Priority Data

Aug. 30, 2012 (JP) ................................ 2012-190523

(51) Int. Cl.
| H02K 7/06 | (2006.01) |
| H02K 1/06 | (2006.01) |
| F03G 7/10 | (2006.01) |
| H02K 53/00 | (2006.01) |

(52) U.S. Cl.
CPC .. *H02K 1/06* (2013.01); *F03G 7/10* (2013.01); *H02K 53/00* (2013.01); *Y10S 74/09* (2013.01)

(58) Field of Classification Search
None
See application file for complete search history.

(56) References Cited

U.S. PATENT DOCUMENTS

| 3,609,425 A * | 9/1971 | Sheridan | H02K 49/10 251/65 |
| 3,967,146 A * | 6/1976 | Howard | H02K 7/06 310/103 |
| 4,153,851 A * | 5/1979 | Hovorka | H02K 49/10 310/103 |
| 4,300,067 A * | 11/1981 | Schumann | H02K 53/00 310/103 |
| 8,336,409 B2 * | 12/2012 | Edwards | H02K 53/00 310/103 |
| 8,487,484 B1 * | 7/2013 | Miller, Jr. | H02K 49/102 310/12.14 |

FOREIGN PATENT DOCUMENTS

| EP | 0244376 A2 | 11/1987 |
| FR | 2784523 A1 | 4/2000 |
| JP | 2002027735 A | 1/2002 |
| JP | 4896269 B1 | 3/2012 |
| WO | 2005/088811 A1 | 9/2005 |

OTHER PUBLICATIONS

International Search Report dated Sep. 24, 2013 from corresponding Int'l Application No. PCT/JP2013/072600; 4 pgs.

* cited by examiner

*Primary Examiner* — Tran Nguyen
(74) *Attorney, Agent, or Firm* — Maier & Maier, PLLC

(57) ABSTRACT

A rotation assistance mechanism equipped with an attraction unit having a pair of magnetic bodies for which the opposite poles of the bodies are arranged facing one another. A magnetic body driving unit changes the distance between the pair of magnetic bodies with a prescribed period by means of the rotation of a rear wheel. A shielding unit has a pair of magnetic surfaces, the poles of which are the same as the respective opposing surfaces of the pair of magnetic bodies. A shield-driving unit that, in conjunction with the prescribed period, propels the shielding unit into the interval between the pair of magnetic bodies when the distance between the pair of magnetic bodies is reduced, and retracts the shielding unit from the interval between the pair of magnetic bodies when the distance between the pair of magnetic bodies is increased.

4 Claims, 15 Drawing Sheets

(a)

(b)

(a)

(b)

(a)

(b)

(a)

(b)

(a)

(b)

ROTATION ASSISTANCE MECHANISM AND ROTATING POWER MECHANISM EQUIPPED WITH SAME

TECHNICAL FIELD

The present invention relates to a rotation assistance mechanism and a rotating power mechanism equipped with same which can be generally applied to an apparatus which operates with a rotational driving force transmitted from a power source, and further relates to a bicycle, an electric fan, a belt conveyor, an escalator, a kneading machine, and a sign pole, which are equipped with the rotation assistance mechanism and the rotating power mechanism.

BACKGROUND ART

Conventionally, machines driven by rotating a rotation shaft have been used, such as bicycles, automobiles, electric fans, belt conveyors, escalators and kneading machines. For example, a user drives a bicycle to run on the ground by turning a pedal which is a rotational driving source to generate propulsive power by transmitting a rotational driving force therefrom to the front and rear wheels through a chain. The bicycles as used in this manner include the so-called assist bicycle equipped with an electric motor as a rotational driving source and a battery to reduce the efforts required for turning a pedal when starting or climbing up a slope. The pedaling force exerted on this assist bicycle by human power is detected by a detection unit (torque sensor or the like), which outputs a signal indicative of the pedaling force to a control device which drives the electric motor in accordance with the pedaling force (for example, refer to the Patent Document 1).

On the other hand, another example of the machines which are rotationally driven is an electric fan equipped with a blade assembly which is provided with a plurality of blades and connected to the rotation shaft of an electric motor which is a power source. This electric fan can generate an air flow by transmitting the driving force of the electric motor to the vanes and rotating the blade assembly with the driving force (for example, refer to Patent Document 2).

PRIOR ART LITERATURE

Patent Document

[Patent Document 1]
Japanese Patent Published Application No. 09-123981
[Patent Document 2]
Japanese Patent Published Application No. 2010-024888

SUMMARY OF INVENTION

Problems to be Solved by the Invention

However, generally speaking in the case of the machines which are rotationally driven as described above, a driving force is directly transmitted from a power source which is directly connected to a rotation shaft so that, when the power source is stopped, the transmitted driving force is lost. From this fact, conventionally, an electric power of no lower than a predetermined level has to be constantly supplied in order to successively operate the device.

For example, since a drive motor mounted on an assist bicycle has to be driven while turning a wheel, there is a problem that power consumption increases so that the battery is frequently used up. Such an assist bicycle with a run-out charged battery is simply heavy and conversely increases the driver's burden because of the battery and the motor which increase the total weight of the bicycle. Furthermore, in the case of an electric fan, since a motor has to be driven while a blade assembly is rotating, there is also a problem that power consumption increases.

In order to solve the problem as described above, it is an object of the present invention to provide a rotation assistance mechanism, a rotating power mechanism equipped with the rotation assistance mechanism, and an electric fan, a belt conveyor, an escalator, a kneading machine and a sign pole which are provided with the rotation assistance mechanism respectively, wherein a driving force is transmitted from a power source to rotationally drive an apparatus through a rotation axis to which momentum is imparted by the rotation assistance mechanism to assist the rotation thereof and improve the usefulness.

Means to Solve the Problems

In order to accomplish the object as described above, the present invention provides a rotation assistance mechanism of imparting momentum to the rotation of a rotation axis, comprising: an attraction unit including a pair of magnetic members which are located with opposite poles facing each other; a magnet drive unit configured to change the distance between the pair of magnetic members in predetermined cycles by the rotation of the rotation axis; a shield unit provided to be advanced to and retracted from between the pair of magnetic members facing each other; and a shield drive unit configured to advance the shield unit to between the pair of magnetic members in predetermined cycles when the distance between the pair of magnetic members is contracted, and retract the shield unit from between the pair of magnetic members in the predetermined cycles when the distance between the pair of magnetic members is expanded, wherein the shield unit has a pair of magnetic surfaces facing the pair of magnetic members respectively and having magnetic polarities which are opposite to those of the corresponding surfaces of the pair of magnetic members respectively.

In accordance with the invention as described above, since the shield unit is provided with the pair of magnetic surfaces facing the pair of magnetic members respectively and having magnetic polarities which are opposite to those of the corresponding surfaces of the pair of magnetic members respectively, the shield drive unit generates a repulsive magnetic force by advancing the shield unit to between the pair of magnetic members when the distance between the pair of magnetic members is contracted, and an attracting force between the pair of magnetic members with opposite poles facing each other by retracting the shield unit from between the pair of magnetic members when the distance between the pair of magnetic members is expanded. As a result, it is possible to continuously generate the attractive force and the repulsive force by the magnetic members, and impart momentum to the rotation of the rotation axis. As a result, for example, by providing a bicycle with the rotation assistance mechanism, it is possible to pedal without requiring efforts and reduce the weight and cost of a bicycle even without installing an electric motor. Also, in the case where the rotation assistance mechanism is installed in a bicycle or an electric fan equipped with an electric motor, since momentum can be imparted to the rotation of the rotation axis of the electric motor, the rotation force is not reduced even when supplying electric power only in an intermittent manner, and thereby it is possible to reduce the power consumption. Furthermore, it is possible to lower the occurrence frequency of exhaustion of the battery of an assist bicycle.

In the case of the above invention, it is preferred that the attraction unit is provided with a pair of arm members which support the pair of magnetic members respectively and relatively pivot in order to widen and narrow the distance therebetween, that the magnet drive unit comprising: a rotary member configured to rotate together with the rotation axis; a plane groove cam formed with a guide groove which is carved on the surface of the rotary member; and a pair of coupling pins projected to the rotary member from the arm members respectively and guided by the guide groove to widen and narrow the distance between the arm members, that the shield unit has an eccentric rotary plate which is rotated around a decentered rotation axis and provided with the pair of magnetic surfaces on the front and back sides thereof, that the shield drive unit has a gear unit which convert the rotation force of the rotary member to the rotation of the eccentric rotary plate, and that the shield drive unit advances the magnetic surfaces of the eccentric rotary plate to between the pair of magnetic members in predetermined cycles when the distance between the pair of arm members is contracted, and retracts the magnetic surfaces of the eccentric rotary plate from between the pair of magnetic members in the predetermined cycles when the distance between the pair of arm members is expanded.

In this case, since the eccentric rotary plate is provided with the pair of magnetic surfaces facing the pair of magnetic members respectively and having magnetic polarities which are opposite to those of the corresponding surfaces of the pair of magnetic members respectively, the shield drive unit generates a repulsive magnetic force by advancing the eccentric rotary plate to between the pair of magnetic members when the distance between the arm members is contracted, and an attracting force between the pair of magnetic members with opposite poles facing each other by retracting the eccentric rotary plate from between the pair of magnetic members when the distance between the pair of magnetic members is expanded. In accordance with the present invention as described above, since momentum can be imparted to the rotation of the rotation axis by continuously generating an attracting force and a repulsive force with the magnetic members, it is possible to assist the rotation thereof and improve the usefulness.

In the case of the above invention, it is preferred that the attraction unit comprising: an inner ring unit in the form of a cylinder which rotates together with the rotation of the rotation axis and provided with a plurality of magnetic members arranged on its outer surface; and an outer ring unit in the form of a cylinder which is fitted inside the inner ring unit and provided with a plurality of magnetic members arranged on its inner surface, that the magnet drive unit rotates the inner ring unit in relation to the outer ring unit by the rotation of the rotation axis, that the shield unit is provided with a plurality of projection members having the magnetic surfaces in the front and back sides thereof, and moves the projection members forward and backward between the outer surface of the inner ring unit and the inner surface of the outer ring unit, that the shield drive unit includes a cylindrical groove cam which converts the rotation force of the rotary member to the forward and backward motion of the projection member, and that the shield drive unit advances the magnetic surfaces of the projection members between the magnetic members of the inner ring unit and the magnetic members of the outer ring unit in predetermined cycles with the timing when the magnetic members of the outer ring unit come close to the magnetic members of the inner ring unit with opposite polarities respectively and retracts the magnetic surfaces of the projection members from between the magnetic members of the inner ring unit and the magnetic members of the outer ring unit in the predetermined cycles with the timing when the magnetic members of the outer ring unit come close to the magnetic members of the inner ring unit with the same polarities respectively.

In this case, since the shield unit of the present embodiment is provided with the plurality of projection members having the magnetic surfaces on the front and back sides thereof respectively, a repulsive magnetic force can be generated by advancing the magnetic surfaces of the projection members between the magnetic members of the inner ring unit and the magnetic members of the outer ring unit with the timing when the magnetic members of the outer ring unit come close to the magnetic members of the inner ring unit with opposite polarities respectively in synchronization with the rotation of the rotation axis. Furthermore, an attractive force is generated between the paired magnetic members and with opposite poles facing each other by retracting the magnetic surfaces of the projection members from between the magnetic members of the inner ring unit and the magnetic members of the outer ring unit in the predetermined cycles with the timing when the magnetic members of the outer ring unit come close to the magnetic members of the inner ring unit with the same polarities respectively. As a result, it is possible to continuously generate the attractive force and the repulsive force by the magnetic members, impart momentum to the rotation of the rear wheel, and therefore improve the usefulness by assisting the rotation thereof. Particularly, in accordance with the present invention, the attraction unit is constructed by arranging a number of magnetic members on a cylindrical side surface to further generate an attracting force and a repulsive force with the magnetic members, and therefore it is possible to further impart momentum to the rotation of the rotation axis.

The rotation assistance mechanism as described above can be constructed as a rotating power mechanism, which is another invention, by combining with a power source configured to generate a rotational driving force for rotating a rotation axis. This rotating power mechanism can be used for an electric fan, a belt conveyor, an escalator, a sign pole, a kneading machine or the like which are further inventions. Particularly, the rotating power mechanism turns on/off the driving force generation mechanism of a power source to generate the rotational driving force intermittently in synchronization with the timing that the magnetic members of the rotation assistance mechanism generate an attracting force or a repulsive force.

More specifically, the invention relating to the electric fan comprises any one of the rotating power mechanisms as recited in the above description; a blade assembly having a plurality of blades; and an electric machine configured to rotationally drive the blade assembly as the power source, wherein the rotation axis is provided as a link member for transmitting the torque generated by the electric machine to the blade assembly.

Since the electric fan of the present invention as discussed above is provided with the rotation axis as a link member for transmitting the driving force generated by the electric machine to the blade assembly, when a driving force is transmitted to this rotation axis, the rotation assistance mechanism is operated to continuously generate an attracting force and a repulsive force with the magnetic members and impart momentum to the rotation of the rotation axis so that it is possible to increase the air flow from the blade assembly.

Furthermore, since momentum is imparted to the rotation of the rotation axis, the driving force generation mechanism of the power source is turned on/off to generate the rotational driving force intermittently in synchronization with the timing that the magnetic members of the rotation assistance mechanism generate an attracting force or a repulsive force, and as a result it is possible to generate the same rotation force as in conventional techniques only with a small amount of electric power and thereby reduce the power consumption.

Furthermore, in accordance with the present embodiment, it is possible to add variation to the rotation of the rotation axis, for example, in the form of irregularities such as "fluctuations", by generating the attracting force and the repulsive force with the magnetic members. As a result, in accordance with the present embodiment, air flows can be generated with variations in strength.

Also, the invention relating to the belt conveyor comprises any one of the rotating power mechanisms as recited in the above description; an endless transfer belt which is wound and spanned between a pair of rollers; and an electric machine configured to rotationally drive the rollers as the power source to endless move the transfer belt, wherein the rotation axis is provided as a link member for transmitting the driving force generated by the electric machine to the rollers.

Since the belt conveyor of the present invention as discussed above is provided with the rotation axis as a link member for transmitting the driving force generated by the electric machine to the rollers of the respective devices, when a driving force is transmitted to this rotation axis, the rotation assistance mechanism is operated to continuously generate an attracting force and a repulsive force with the magnetic members and impart momentum to the rotation of the rotation axis so that it is possible to impart momentum to the rotation of the rotation axis to rotate the rollers. As a result, since the same rotation force can be generated as in conventional techniques only with a small amount of electric power, it is possible to reduce the power consumption by turning on/off the driving force generation mechanism of the power source to generate the rotational driving force intermittently in synchronization with the timing that the magnetic members of the rotation assistance mechanism generate an attracting force or a repulsive force.

Furthermore, the invention relating to the escalator comprises any one of the rotating power mechanisms as recited in the above description; a circulating member which is wound and spanned between a pair of sprockets and circularly move between the pair of sprockets; an electric machine configured to rotationally drive the sprockets as the power source to endless move the circulating member; and a plurality of footboards which are arranged in an endless fashion along the circulating member, linked with the circulating member to circularly move together with the circulating member and having treads on which passenger can stand, wherein the rotation axis is provided as a link member for transmitting the driving force generated by the electric machine to the sprockets.

Since the escalator of the present invention as discussed above is provided with the rotation axis as a link member for transmitting the driving force generated by the electric machine to the sprockets of the respective devices, when a driving force is transmitted to this rotation axis, the rotation assistance mechanism is operated to continuously generate an attracting force and a repulsive force with the magnetic members and impart momentum to the rotation of the rotation axis so that it is possible to impart momentum to the rotation of the rotation axis to rotate the sprockets. As a result, since the same rotation force can be generated as in conventional techniques only with a small amount of electric power, it is possible to reduce the power consumption by turning on/off the driving force generation mechanism of the power source to generate the rotational driving force intermittently in synchronization with the timing that the magnetic members of the rotation assistance mechanism generate an attracting force or a repulsive force.

Still further, the invention relating to the kneading machine comprises any one of the rotating power mechanisms as recited in the above description; a casing in which a material to be kneaded is supplied; a stirring unit installed in the casing; an electric machine configured to rotationally drive the stirring unit, wherein the rotation axis is provided as a link member for transmitting the driving force generated by the electric machine to the stirring unit. Since the kneading machine of the present invention as discussed above is provided with the rotation axis as a link member for transmitting the driving force generated by the electric machine to the stirring unit, when a driving force is transmitted to this stirring unit, the rotation assistance mechanism is operated to continuously generate an attracting force and a repulsive force with the magnetic members and impart momentum to the rotation of the rotation axis so that it is possible to increase the stirring ability by accelerating the rotation of the stirring means. Since momentum is imparted to the rotation of the rotation axis, it is possible to generate the same rotation force as in conventional techniques only with a small amount of electric power, and reduce the power consumption by turning on/off the driving force generation mechanism of the power source to generate the rotational driving force intermittently in synchronization with the timing that the magnetic members of the rotation assistance mechanism generate an attracting force or a repulsive force. Furthermore, in accordance with the present embodiment, it is possible to add variation to the rotation of the rotation axis, for example, in the form of irregularities such as "fluctuations", by generating the attracting force and the repulsive force with the magnetic members. As a result, in accordance with the kneading machine, the material to be kneaded can be stirred with variations in strength.

Still further, the invention relating to the sign pole comprises any one of the rotating power mechanisms as recited in the above description; a transparent external cylinder; a rotary cylinder which is rotatably supported in relation to the external cylinder and capable of rotating in the external cylinder; an electric machine configured to rotationally drive the rotary cylinder as the power source, wherein the rotation axis is provided as a link member for transmitting the driving force generated by the electric machine to the rotary cylinder. Since the sign pole of the present invention as discussed above is provided with the rotation axis as a link member for transmitting the driving force generated by the electric machine to the stirring unit of the respective devices, when a driving force is transmitted to this rotation axis, it is possible to reduce the power consumption by turning on/off the driving force generation mechanism of the power source to generate the rotational driving force intermittently in synchronization with the timing that the magnetic members of the rotation assistance mechanism generate an attracting force or a repulsive force. Furthermore, in accordance with the present embodiment, it is possible to add variation to the rotation of the rotation axis, for example, in the form of irregularities such as "fluctuations", by generating the attracting force and the repulsive force with the magnetic members. As a result, in accordance with the sign pole, it is possible to enhance a designability in the motion of the rotary cylinder.

Effects of the Invention

As has been discussed above, in accordance with the present invention applied to the apparatus which is rotationally driven by the driving force transmitted from a power source through a rotation axis, it is possible to assist the rotation thereof and improve the usefulness.

BEST MODE FOR CARRYING OUT THE INVENTION

First Embodiment

In what follows, an embodiment of a rotation assistance mechanism in accordance with the present invention will be explained in detail. Meanwhile, in the case of the present embodiment, an example will be explained in the case where the rotation assistance mechanism of the present invention is applied to a wheel of a bicycle 10. However, the present invention can be applied also to all the machines which are rotationally driven such as the wheels of bicycles and automobiles, water wheels, windmills, and the machines provided with generators such as electric fans, belt conveyors, escalators, kneading machines and the like.

(Overall Configuration of Bicycle)

Figure 1:
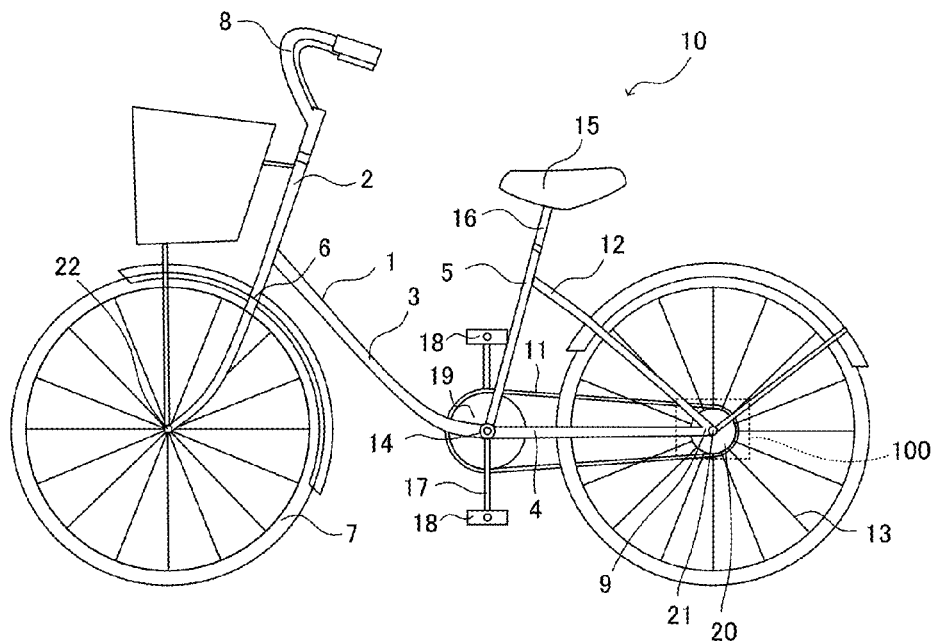
FIG. 1 is a schematic representation showing the overall configuration of a bicycle in accordance with a first embodiment.

FIG. 1 is a schematic representation showing the overall configuration of a bicycle 10 in accordance with a first embodiment of the present invention. The bicycle 10 of the present embodiment includes a body frame 1 having a head tube 2 located in the front side of the body frame 1, a down tube 3 extending from the head tube 2 in the rear-downward direction, a rear fork 4 connected to the down tube 3 and extending in the rear direction, and a seat post 5 rising upward from the lowermost end of the down tube 3.

A front fork 6 is rotatably supported on the head tube 2. Also, the lower end of the front fork 6 is provided with a hub 22 through which the entirety of a front wheel 7 is axially supported on an axle. Furthermore, the upper end of the front fork 6 is provided with a handlebar 8. Meanwhile, although not shown in the figure, the handlebar 8 is provided with brake levers for the front and rear wheels. Cables are extracted from the brake levers and linked with a front wheel brake and a rear wheel brake respectively.

A crank shaft 14 extending in the lateral direction of the body frame is supported at the crossed section between the down tube 3 and the seat post 5, and connected to the pedals 18 through cranks 17. The crank shaft 14 is connected to a driving sprocket 19 so that the pedal force exerted on the pedals 18 is transmitted to the driving sprocket 19. A chain 11 is spanned between the driving sprocket 19 and a non-driven sprocket 20 which is fixed to the axle 21 of a rear wheel 13.

The seat post 5 is provided with a support shaft 16 having an upper end on which a seat 15 is mounted in order that the height of the seat 15 can be adjusted. Also, a pair of left and right stays 12 are connected to the upper end of the seat post 5, extending in the rear-downward direction, and joined with the rear fork 4 near the lower end thereof. The rear wheel 13 is supported on the axle 21 which is horizontally extending in the right and left direction of the body frame on a rear end 9 where the rear fork 4 and the stays 12 are crossing and connected to each other. The rotation assistance mechanism 100 of the present embodiment is supported by the rear end 9 and located coaxially with the axle 21 which is the rotation axis of the rear wheel 13.

(Rotation Assistance Mechanism)

Figure 2:
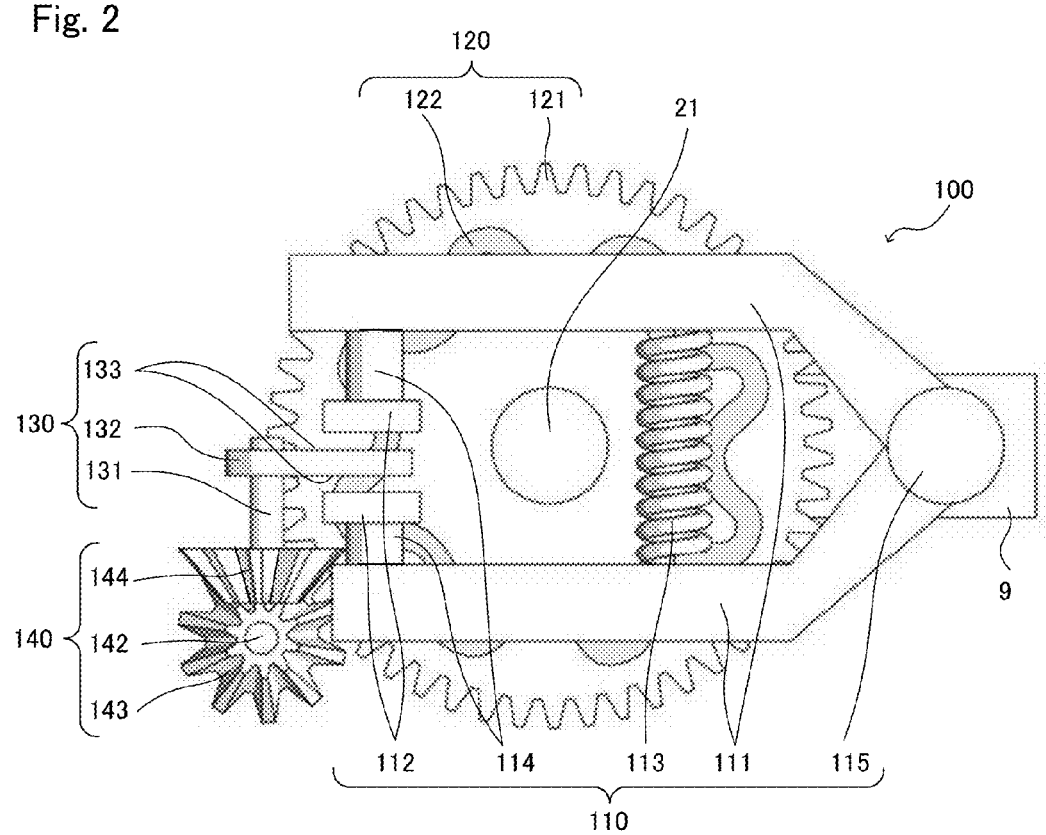
FIG. 2 is a side view for showing the structure of the rotation assistance mechanism in accordance with the first embodiment.

Next, the configuration of the rotation assistance mechanism 100 will be explained. FIG. 2 is a side view for showing the structure of the rotation assistance mechanism 100 of the first embodiment, FIG. 3 is a top view thereof, and FIG. 4 is a front view thereof.

Figure 3:
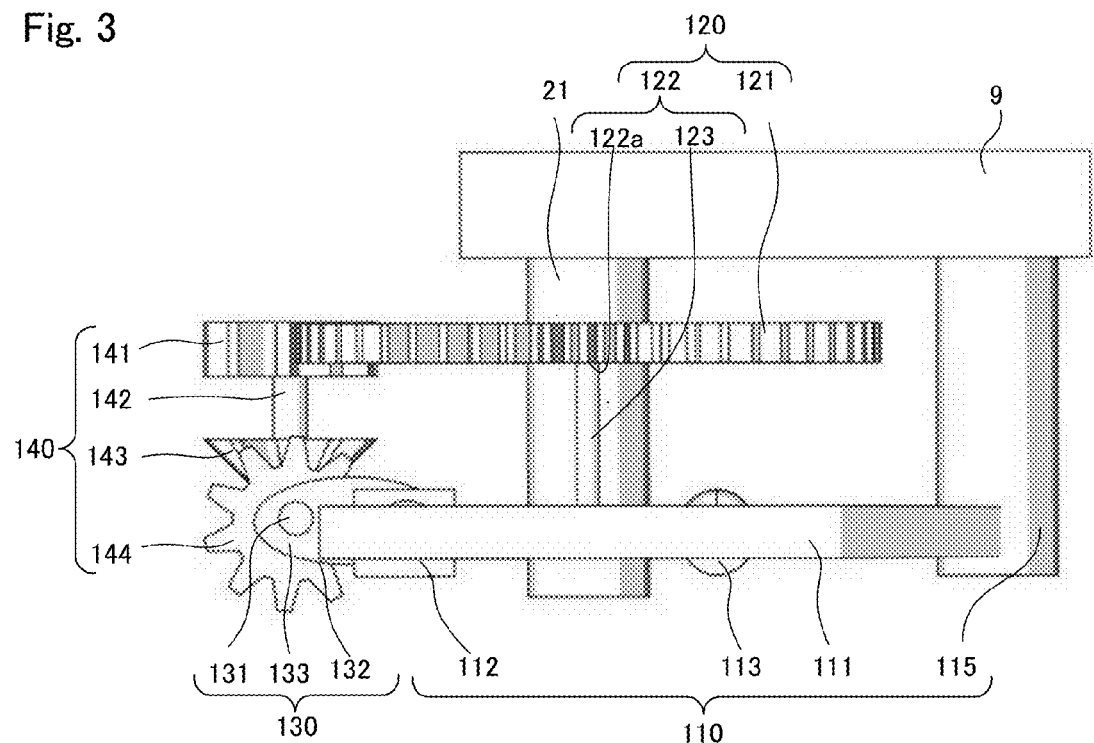
FIG. 3 is a top view for showing the structure of the rotation assistance mechanism in accordance with the first embodiment.
Figure 4:
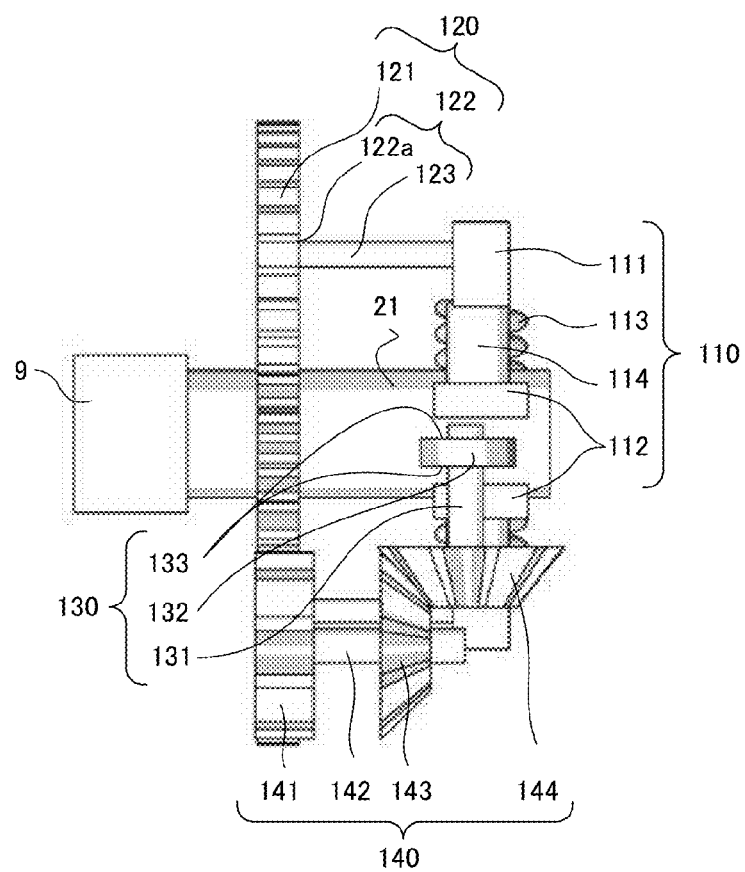
FIG. 4 is a front view for showing the structure of the rotation assistance mechanism in accordance with the first embodiment.

As shown in FIG. 2 through FIG. 4, the rotation assistance mechanism 100 is a mechanism for imparting momentum to the rotation of the axle 21 and rear wheel 13, and provided with an attraction unit 110 for giving a rotation force to the axle 21 and rear wheel 13 by the use of the attracting force of a magnet, a magnet drive unit 120 which drives the attraction unit 110, a shield unit 130 for strengthening or weakening the attracting force of the attraction unit 110, and a shield drive unit 140 for periodically driving the shield unit 130.

The attraction unit 110 is a drive unit having a pair of magnetic members 112 and 112 with opposite poles facing each other. In the case of the present embodiment, the attraction unit 110 includes a pair of upper and lower arm members 111 and 111 which support the pair of magnetic members 112 and 112 respectively and relatively pivot in order to widen and narrow the distance between the magnetic members 112 and 112 in the vertical direction.

These arm members 111 and 111 are vertically arranged as a pair approximately in a U-shaped fashion. Each of the arm members 111 and 111 is axially and pivotally supported on a rotating shaft 115 which is fixed to the rear end 9 of the rear fork 4. Then, the arm members 111 and 111 can pivot around the rotating shaft 115 to open in the vertical direction. On the other hand, a resilient member 113 is engaged between the arm members 111 and 111 in order to urge the arm members 111 and 111 located at a certain distance with this interposed resilient member 113.

The magnet drive unit 120 is a driving mechanism which changes the distance between the pair of magnetic members 112 and 112. More specifically, the magnet drive unit 120 is provided with a rotary member 121 which rotates integrally with the axle 21 of the rear wheel 13, and a plane groove cam 122 for transmission of the rotation force of this rotary member 121. This rotary member 121 is a gear in the form of a disk which rotates around the axle 21 in a plane parallel with the rotation plane of the rear wheel 13.

In addition, a guide groove 122a are carved on the outer surface of the rotary member 121 to form the plane groove cam 122 with coupling pins 123 formed of the arm members 111 respectively. The guide groove 122a is carved in the form of a sine wave closed as an endless loop. The distance between the guide groove 122a and the axle 21 as the center of rotation varies in accordance with the angle about the center so that two opposite points on the guide groove 122a symmetrically located with the axle 21 as the center move toward and away from each other in accordance with the central angle, resulting in the variable distance between the two points.

Furthermore, the pair of coupling pins 123 and 123 are provided on and projected from the arm members 111 and 111 respectively toward the rotary member 121. The coupling pins 123 function as follower members as part of the plane groove cam 122, and inserted into the guide groove 122a and guided along the endless sine curve to widen and narrow the distance between the arm members 111. That is, the these coupling pins 123 and 123 are inserted into the guide groove 122a as described above at symmetric positions with reference to the axle 21 therebetween, guided through the guide groove 122a while the rotary member 121 is rotating, and thereby the arm members 111 and 111 are pivoted about the rotating shaft 115 in the vertical direction to change the distance between the pair of magnetic members 112 and 112 in predetermined cycles.

The shield unit 130 includes an eccentric rotary plate 132 which is arranged in order to move towards and away between the pair of magnetic members 112 and 112, which are located opposite each other. The eccentric rotary plate 132 is provided with a pair of magnetic surfaces in the front and back sides thereof which are located to face the opposite surfaces 112a and 112a of the magnetic members 112 and 112 respectively such that the magnetic polarities of the magnetic surfaces 133 and 133 are opposite those of the corresponding surfaces 112a and 112a respectively. The eccentric rotary plate 132 is an elliptic plate member and driven to rotate around its rotation axis 131 which is decentered such that the pair of magnetic surfaces 133 and 133 on the front and back sides of the eccentric rotary plate 132 are advanced and retracted between the magnetic members 112 and 112 during rotation.

The shield drive unit 140 is a driving mechanism which advances the shield unit 130 to between the pair of magnetic members 112 and 112 in predetermined cycles when the distance between the pair of magnetic members 112 and 112 is contracted, and retracts the shield unit 130 from between the pair of magnetic members 112 and 112 in the predetermined cycles when the distance between the pair of magnetic members 112 and 112 is expanded.

Specifically, the shield drive unit 140 is provided with a gear unit 141 to 144 which convert the rotation force of the rotary member 121 to the rotation of the eccentric rotary plate 132. Namely, the shield drive unit 140 consists of a gear 141 engaged with cut teeth carved on the outer circumference of the rotary member 121 which is rotating together with the rear wheel 13, a bevel gear 143 connected to the gear 141 through a shaft 142, a bevel gear 144 arranged to have a rotation plane perpendicular to the bevel gear 143, and the rotation axis 131 which transmits the rotation force of the bevel gear 144 to the eccentric rotary plate 132.

The shield drive unit 140 thereby transmits the rotation force of the rear wheel 13 to the gear 143 through the rotary member 121, the gear 141 and the shaft 142, and the rotation force of the rear wheel 13 is converted to the rotation in a plane perpendicular to the rotation plane of the rear wheel 13 through the bevel gear 144 engaged with the bevel gear 143 to rotate the eccentric rotary plate 132 around the rotation axis 131. By this configuration, the eccentric rotary plate 132 is rotated in order that the magnetic surfaces 133 of the eccentric rotary plate 132 are advanced to between the pair of magnetic members 112 and 112 in predetermined cycles according to the rotation of the rear wheel 13 when the distance between the pair of arm members 111 and 111 is contracted, and retracted from between the pair of magnetic members 112 and 112 in the predetermined cycles when the distance between the pair of arm members 111 and 111 is expanded.

(Operation of Rotation Assistance Mechanism)

Figure 5:
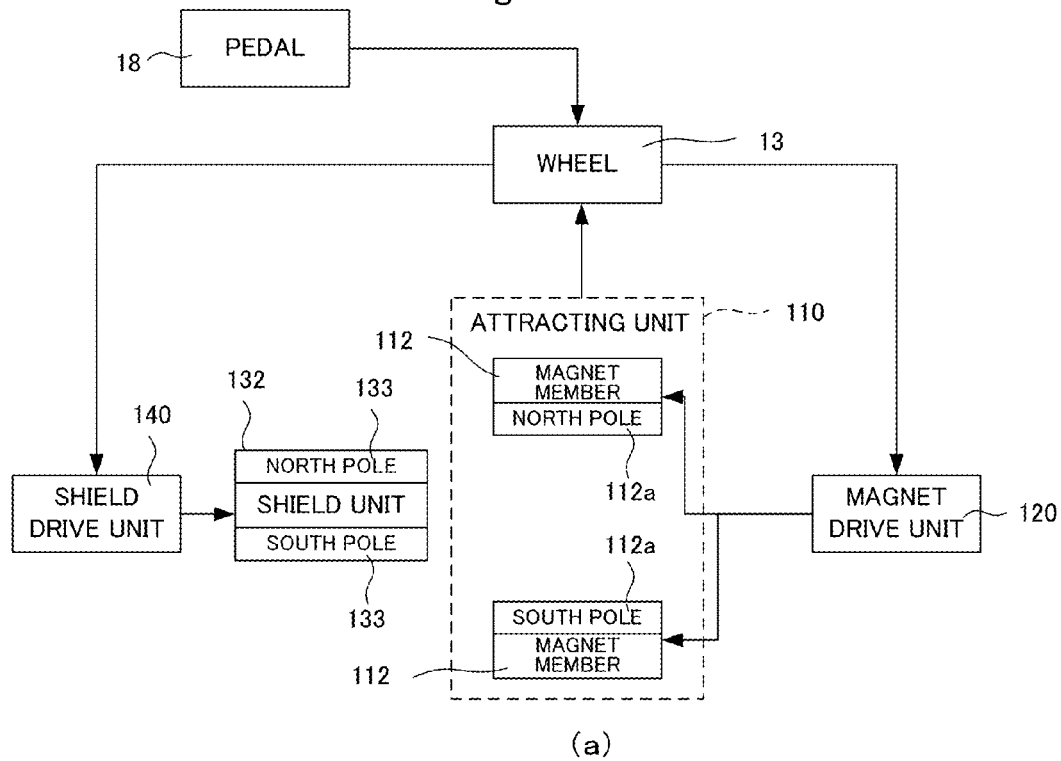
FIG. 5 is a block diagram for schematically showing the operation of the rotation assistance mechanism in accordance with the first embodiment.
Figure 6:
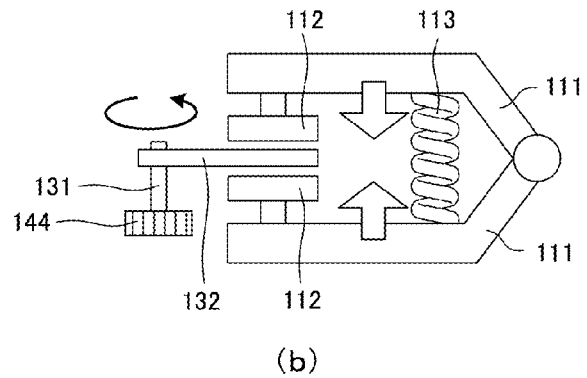
FIG. 6(a) and FIG. 6(b) are explanatory views for schematically showing the operation of the rotation assistance mechanism in accordance with the first embodiment.
Figure 6:
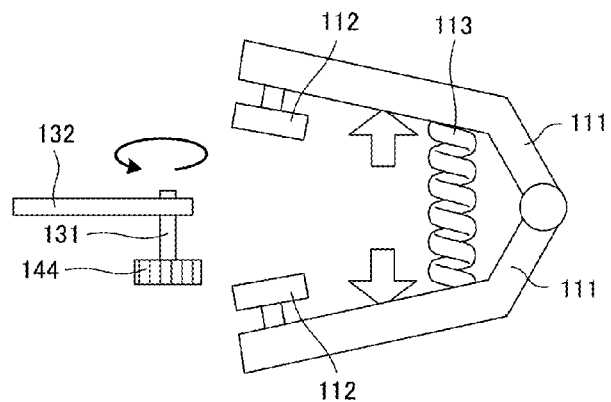
Figure 7:
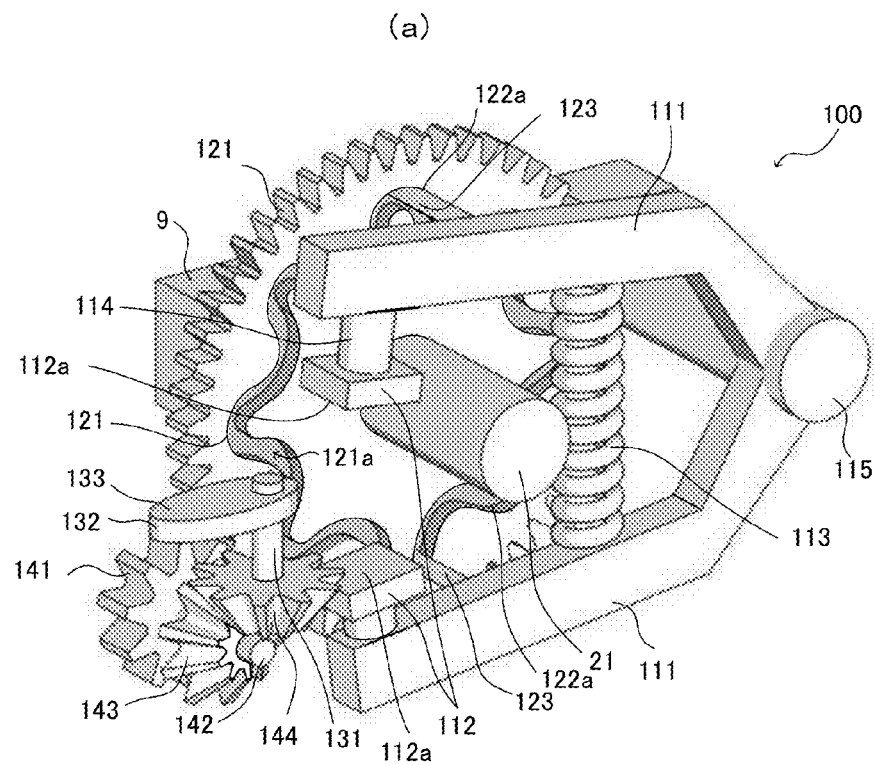
FIG. 7(a) and FIG. 7(b) are perspective views for showing the rotation assistance mechanism before and after operation in accordance with the first embodiment.
Figure 7:
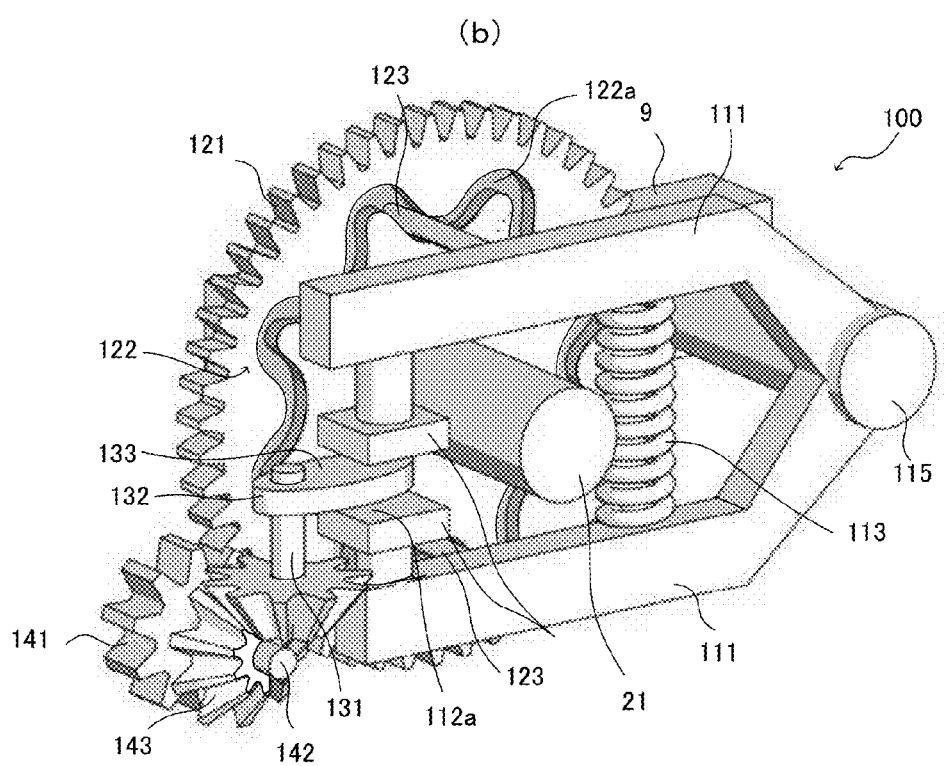

The operation of the rotation assistance mechanism 100 having the configuration as described above will be explained in the following description. FIG. 5 is a block diagram for schematically showing the operation of the rotation assistance mechanism 100. FIGS. 6(a) and 6(b) are explanatory views for schematically showing the operation of the rotation assistance mechanism 100. FIGS. 7(a) and 7(b) are perspective views for showing the rotation assistance mechanism 100 before and after operation.

First, the rear wheel 13 of the bicycle 10 is rotated by turning the pedal 18 of the bicycle 10. The rotation of this rear wheel 13 is transmitted to the shield drive unit 140 and the magnet drive unit 120. The magnet drive unit 120 changes the distance between the pair of magnetic members 112 and 112 in the predetermined cycles when the rear wheel 13 is rotating. Specifically speaking, when the rear wheel 13 rotates, the rotary member 121 connected to the axle 21 of the rear wheel 13 also rotates together. The plane groove cam 122 consisting of the guide groove 122a and the coupling pins 123 of the arm member 111 is driven by this rotation force. The coupling pins 123 engaged with the guide groove 122a move toward and away from each other in accordance with the rotation angle of the rotary member 121 to widen and narrow the distance therebetween.

More specifically, this rotary member 121 is provided with the carved guide groove 122a into which the pair of coupling pins 123 and 123 are inserted at symmetric positions with reference to the axle 21 to form the plane groove cam 122. When the rotary member 121 rotates as part of this plane groove cam 122, the guide groove 122a rotates together so that the pair of coupling pins 123 and 123 inserted into the guide groove 122a are guided along the profile of the guide groove 122a (in the form of an annular sine curve) and move toward and away from each other in accordance with the central angle to widen and narrow the distance the two points. The arm members 111 and 111 are then opened and closed around the rotating shaft 115 in the vertical direction by the pair of coupling pins 123 and 123 to change the distance between the pair of magnetic members 112 and 112 in predetermined cycles.

On the other hand, the shield drive unit 140 advances and retracts the eccentric rotary plate 132 of the shield unit 130 between the pair of magnetic members 112 and 112 in synchronization with the rotation of the rear wheel 13. The rotation force generated by the rotation of the rear wheel 13 is first transmitted to the eccentric rotary plate 132. Specifically, when the rear wheel 13 rotates, the rotary member 121 connected to the axle 21 of the rear wheel 13 rotates around the axle 21 as a center. Then, through the rotation force of this rotary member 121, the rotation force of the rear wheel 13 is transmitted to the gear 143 through the rotary member 121, the gear 141 and the shaft 142, and the rotation force of the rear wheel 13 is converted to the rotation in a plane perpendicular to the rotation plane of the rear wheel 13 through the bevel gear 144 engaged with the bevel gear 143 to transmit the rotation force of the bevel gear 144 to the rotation axis 131 and rotate the eccentric rotary plate 132.

The eccentric rotary plate 132 is therefore rotated to enter the magnetic surfaces 133 of the eccentric rotary plate 132 between the pair of magnetic members 112 and 112 with the timing when the distance between the pair of arm members 111 and 111 is narrowed. At this time, the magnetic surfaces 133 and 133 of the eccentric rotary plate 132 facing the pair of magnetic members 112 and 112 have the same polarities respectively to induce a repulsive magnetic force and widen the distance between the pair of arm members 111 and 111 as illustrated in FIG. 7(a).

When the arm members 111 and 111 are opened, the pair of coupling pins 123 and 123 moves away from each other along the guide groove in accordance with the central angle to increase the distance between the two points. As has been discussed above, when the distance between the pair of arm members 111 and 111 is widened, the eccentric rotary plate 132 is rotated in order to move the magnetic surfaces 133 of the eccentric rotary plate 132 away from between the pair of magnetic members 112 and 112. The repulsive magnetic force is thereby removed, and an attracting force is generated by the magnetic members 112 and 112 which are arranged with their opposite poles facing each other so that the pair of arm members 111 and 111 attract each other. This operation is continuously repeated in this manner.

Incidentally, since the resilient member 113 is interposed between the pair of arm members 111 and 111, the distance between the pair of arm members 111 and 111 can be expanded and contracted also by the urging force of the resilient member 113.

(Actions/Effects)

As has been discussed above, since the eccentric rotary plate 132 of the present embodiment is provided with the pair of magnetic surfaces 133 and 133 on the front and back sides having the same polarities as the corresponding opposite surfaces of the pair of magnetic members 112 and 112 respectively, a repulsive magnetic force can be generated by advancing the eccentric rotary plate 132 between the pair of magnetic members 112 and 112 with the timing when the distance between the pair of arm members 111 and 111 is narrowed. On the other hand, an attractive force is generated between the pair of magnetic members 112 and 112 with opposite poles facing each other by retracting the eccentric rotary plate 132 from between the pair of magnetic members 112 and 112 with the timing when the distance between the pair of magnetic members 112 and 112 is widened. By this configuration, it is possible to continuously generate the attractive force and the repulsive force by the magnetic members 112 and 112, impart momentum to the rotation of the rear wheel 13, and therefore lessen the pedaling burden. Also, since no electric motor is used, it is possible to reduce the weight and cost of a bicycle.

Furthermore, in accordance with the present embodiment, the distance between the pair of arm members 111 and 111 is expanded and contracted also by the urging force of the resilient member 113, and therefore it is possible to maintain the distance between the pair of arm members 111 and 111 in an appropriate range.

Second Embodiment

Next, a second embodiment of the present invention will be explained. In the case of the first embodiment as described above, the pair of arm members 111 and 111 are used as the attraction unit 110 in the configuration that momentum is imparted to the rotation of the wheel by the attracting force and the repulsive force generated by the two magnetic members. However, in the case of the present embodiment, an attraction unit 210 is constructed by arranging a number of magnetic members on a cylindrical side surface to generate an attracting force and a repulsive force with the magnetic members.

Figure 8:
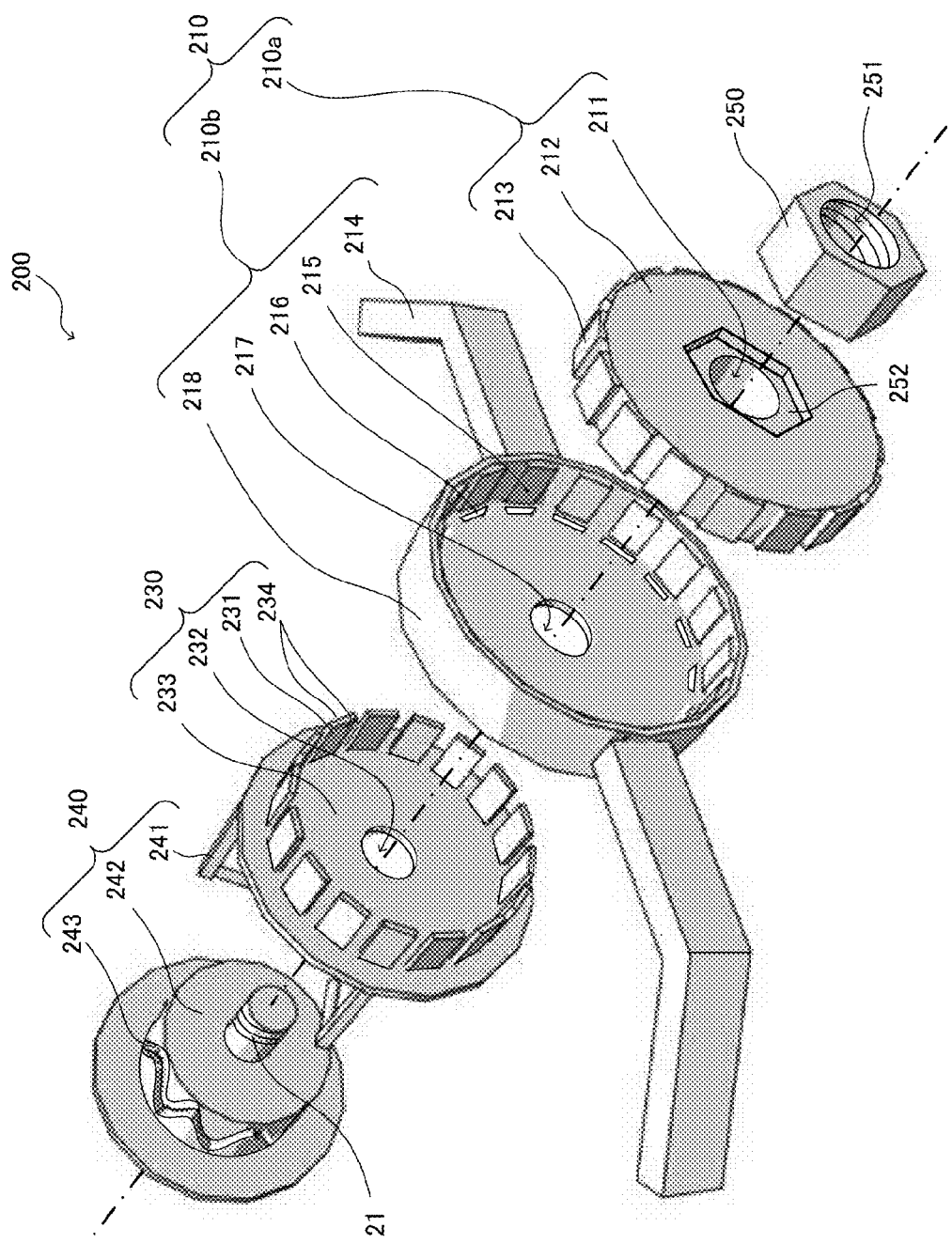
FIG. 8 is exploded perspective views for showing the structure of a rotation assistance mechanism in accordance with a second embodiment.
Figure 9:
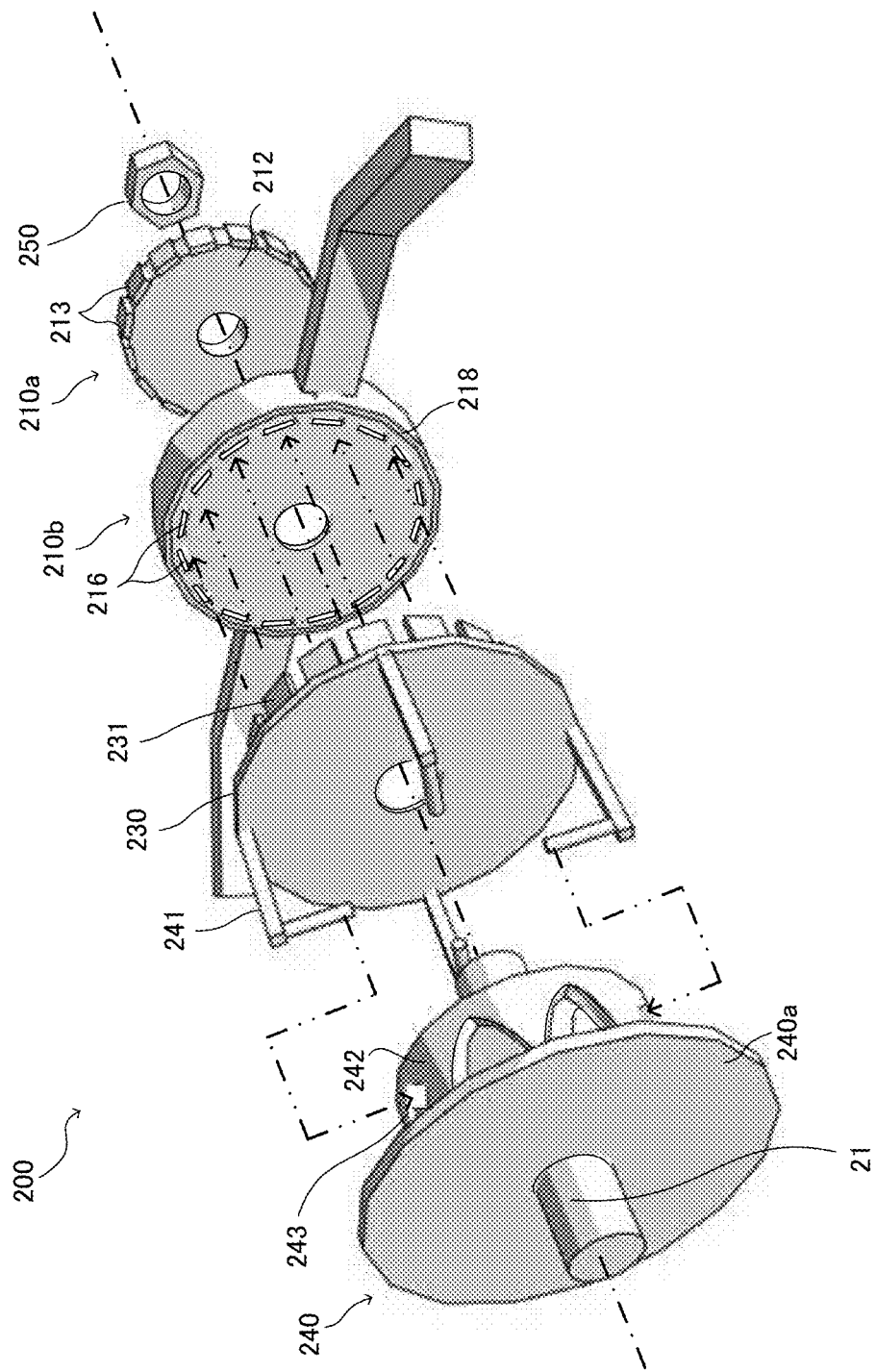
FIG. 9 is exploded perspective views for showing the structure of a rotation assistance mechanism in accordance with the second embodiment.
Figure 10:
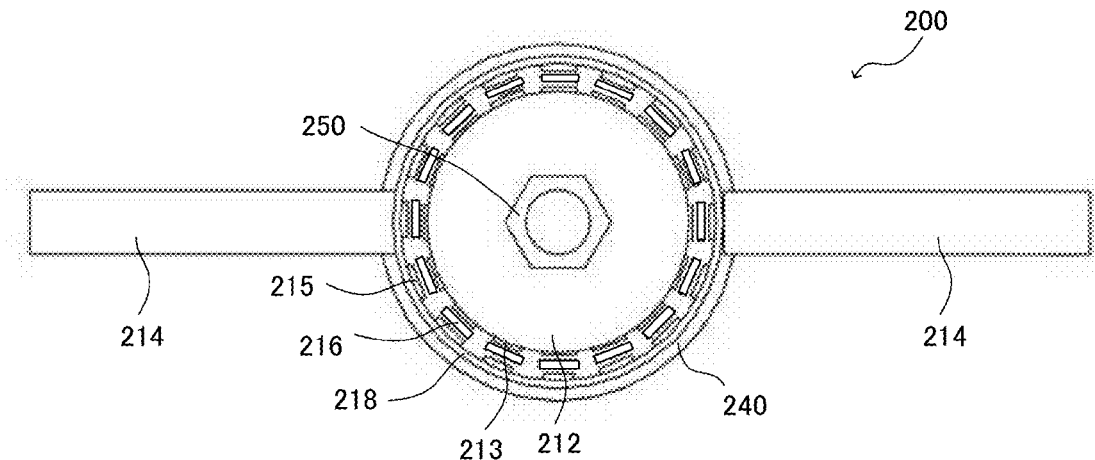
FIG. 10 is a side view for showing the structure of the rotation assistance mechanism in accordance with the second embodiment.
Figure 11:
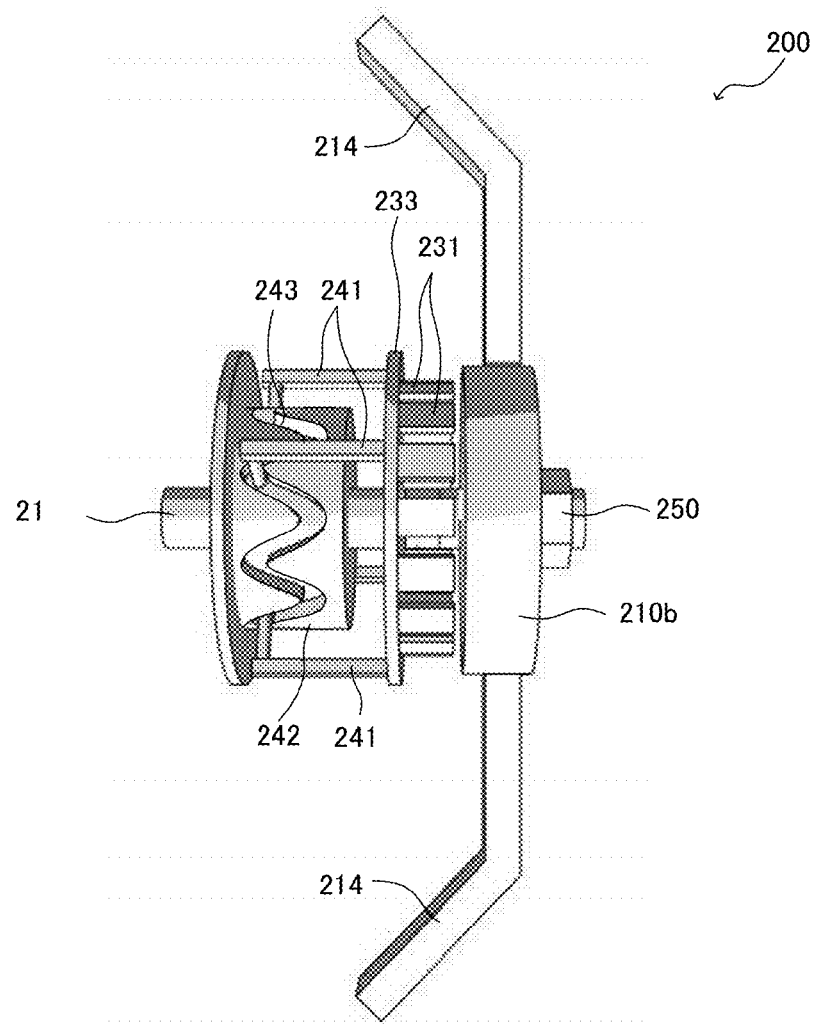
FIG. 11 is a top view for showing the structure of the rotation assistance mechanism in accordance with the second embodiment.
Figure 12:
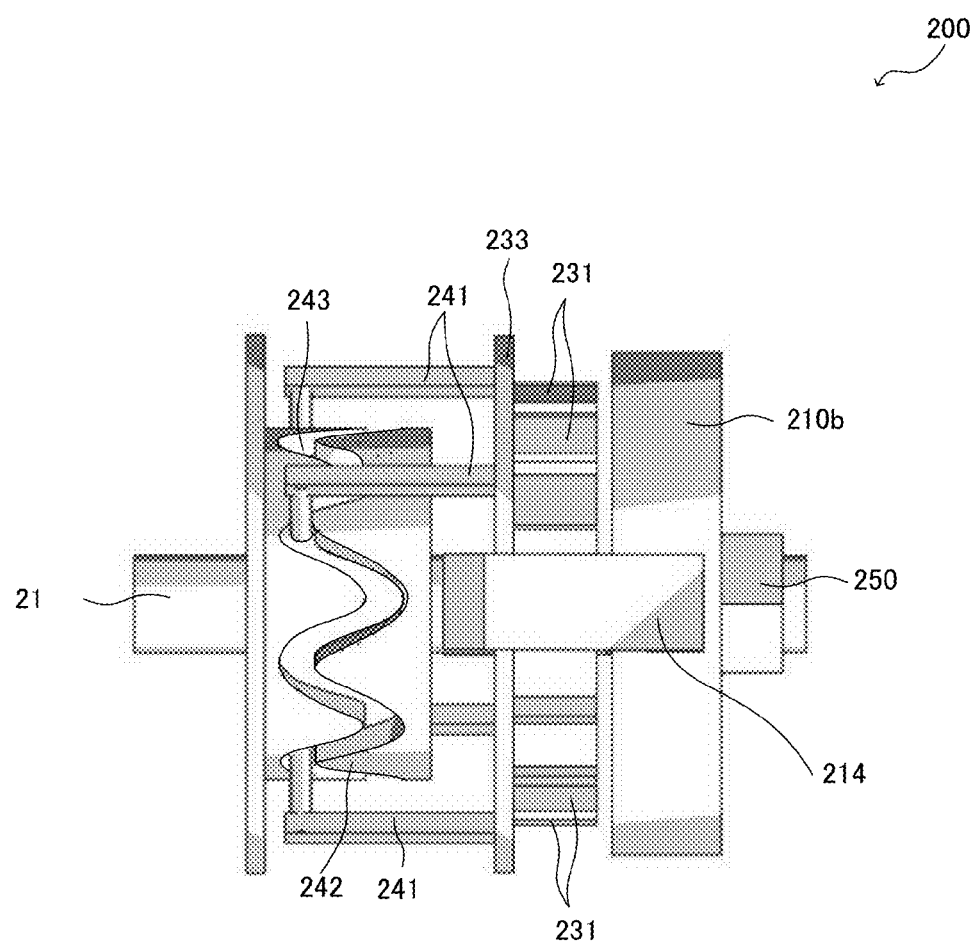
FIG. 12 is a front view for showing the structure of the rotation assistance mechanism in accordance with the second embodiment.

FIG. 8 and FIG. 9 are perspective views for showing the structure of a rotation assistance mechanism 200 in accordance with the second embodiment as exploded views; FIG. 10 is a side view for showing the structure of the rotation assistance mechanism 200; FIG. 11 is a top view thereof; and FIG. 12 is a front view thereof. Meanwhile, in the description of the present embodiment, like reference numbers indicate functionally similar elements as the above first embodiment unless otherwise specified, and therefore no redundant description is repeated.

As illustrated in FIG. 8 and FIG. 9, the rotation assistance mechanism 200 is a mechanism for imparting momentum to the rotation of the axle 21 and rear wheel 13, and provided with the attraction unit 210 for giving a rotation force to the rear wheel 13 through the axle 21 by the use of the attracting force of a magnet, a magnet drive unit consisting of the axle 21 and a stopper member 250 for driving the attraction unit 210, a shield unit 230 for strengthening or weakening the attracting force of the attraction unit 210, and a shield drive unit 240 for periodically driving the shield unit 230. Also in the case of the present embodiment, the power source of the magnet drive unit and the shield drive unit 240 is the axle 21 which is the rotation axis of the rear wheel 13. The rotation force of the axle 21 is transmitted to an inner ring unit 210a through the stopper member 250 of the magnet drive unit, and transmitted directly to a rotary member 242 of the shield drive unit 240.

The attraction unit 210 is a drive unit having magnetic members 213 and 215 which are paired with opposite poles facing each other. In the case of the present embodiment, the attraction unit 210 includes the inner ring unit 210a in the form of a cylinder provided with a plurality of magnetic members 213 on its outer surface and the outer ring unit 210b in the form of a cylinder which is fitted inside the inner ring unit 210a and provided with a plurality of magnetic members 215 on its inner surface.

The inner ring unit 210a has a wheel unit 212 in the form of a disk as a base component with a center hole 211 in the center position of this wheel unit 212. The wheel unit 212 is fixed to the axle 21 which is inserted through the center hole 211 and rotatable integrally with the axle 21. More specifically, an indent section 252 is formed on the outer surface of the wheel unit 212 in the same profile as the stopper member 250, which is threaded on the axle 21 and fitted to the indent section 252 so that the wheel unit 212 and the stopper member 250 are integrally joined to transmit the rotation force of the axle 21 to the wheel unit 212. Then, when the wheel unit 212 rotates around the axle 21 in association with the rotation of the rear wheel 13, the inner ring unit 210a move the magnetic members 213 arranged on the outer surface thereof in relation to the outer ring unit 210b.

On the other hand, the outer ring unit 210b is provided with a housing section 218 in a bottomed cylindrical shape having a center hole 217 in the center position of its bottom portion through which the axle 21 is inserted in order that the outer ring unit 210b is separated from the rotation of the rear wheel 13. More specifically, the housing section 218 of the outer ring unit 210b is fixed to the main body of a bicycle through frame members 214 and 214 which are fixed to the rear end 9 of the bicycle and connected to the opposite sides of the housing section 218 in order that the axle 21 rotates in an idling condition as seen from the center hole 217 in order not to transmit the rotation of the rear wheel 13. On the other hand, the outer ring unit 210b has a hollow space with an outer opening to house the inner ring unit 210a, a number of the magnetic members 215 which are annularly arranged in the inner surface of the housing section 218, and a number of shield apertures 216 which are annularly arranged along the perimeter of the bottom surface of the housing section 218 in correspondence with the arrangement of the magnetic members 215 respectively. The housing section 218 is fixed to the body frame of the bicycle by the frame members 214.

The magnet drive unit of the present embodiment consists of the axle 21 and the stopper member 250, and functions as a driving mechanism which changes the distance between the pair of magnetic members 213 and 215 in predetermined cycles by the rotation of the rear wheel 13. More specifically, the wheel unit 212 is rotated by the stopper member 250 which rotates integrally with the axle 21 of the rear wheel 13. The wheel unit 212 as a rotary member is a cylindrical member which is connected to the axle 21 and axially supports the inner ring unit 210a as discussed above. Then, when the wheel unit 212 rotates by the rotation of the rear wheel 13, the inner ring unit 210a rotates in relation to the outer ring unit 210b. Incidentally, the housing section 218 and the wheel unit 212 are spacially located close to each other, but mechanically separated from each other by a bearing or the like sliding mechanism (not shown in the figure) so that the rotation force of the wheel unit 212 is not transmitted to the housing section 218.

The shield unit 230 is provided with projection members 231 which are arranged to project toward the shield apertures 216 and can be advanced between the outer surface of the inner ring unit 210a and the inner surface of the outer ring unit 210b. The projection member 231 has magnetic surfaces 234 on the front and back sides thereof. The magnetic surface 234 has opposite polarities on the front and back sides.

The shield drive unit 240 is a driving mechanism which advances the magnetic surfaces 234 of the projection members 231 between the magnetic members 213 of the inner ring unit 210a and the magnetic members 215 of the outer ring unit 210b in predetermined cycles with the timing when the magnetic members 215 of the outer ring unit 210b come close to the magnetic members 213 of the inner ring unit 210a with opposite polarities respectively and retracts the magnetic surfaces 234 of the projection members 231 from between the magnetic members 213 of the inner ring unit 210a and the magnetic members 215 of the outer ring unit 210b in the predetermined cycles with the timing when the magnetic members 215 of the outer ring unit 210b come close to the magnetic members 213 of the inner ring unit 210a with the same polarities respectively. More specifically, the shield drive unit 240 consists of a rotary member 242 in the form of a column and four coupling pins 241.

The rotary member 242 is a cylindrical piece connected to the axle 21 and provided with a flange 240a in the form of a disk for protecting the mechanism, and fixed to the axle 21 to rotate by following the axle 21. In addition, a guide groove 243 is carved on the outer peripheral surface of the rotary member 242 to form a cylindrical groove cam which converts the rotation force of the rotary member 242 to the forward and backward motion of the shield unit 230. More specifically, this guide groove 243 is carved in the form of a sine wave closed as an endless loop such that the distance to the outer ring unit 210b varies in accordance with the position on the axle 21. The distance to the outer ring unit 210b at four points on the guide groove 243 symmetrically located with the axle 21 as the center is widened and narrowed in accordance with the position on the axle 21.

Also, the four coupling pins 241 are rod members projecting from the base 233 of the shield unit 230. In the case of the present embodiment, the four coupling pins 241 project from the side opposite to the side from which the projection member 231 are projecting. The base 233 is a plate member in the form of a disk with a center hole 232 which is opened through the front and back sides and through which the axle 21 is inserted. The base 233 is axially supported on the rotary member 242 through the coupling pins 241. This center hole 232 has an inner diameter which is slightly larger than the diameter of the axle 21 so that the axle 21 can rotate in this center hole 232 without transmitting the rotation of the axle 21 to the base 233. The base 233 can slidably move back and forward together with the coupling pins 241 and the projection members 231 only in the axial direction of the axle 21.

The four coupling pins 241 are inserted into the guide groove 243 as described above at four points on a concentric circle around the axle 21 as a center, guided through the guide groove 243 while the rotary member 242 is rotating, and thereby move the shield unit 230 close to and away from the outer ring unit 210b so that the projection members 231 are advanced to and retracted from between the pair of magnetic members 213 and 215 in predetermined cycles.

Specifically, the magnetic surfaces 234 of the projection members 231 are advanced between the magnetic members 213 of the inner ring unit 210a and the magnetic members 215 of the outer ring unit 210b with the timing when the magnetic members 215 of the outer ring unit 210b come close to the magnetic members 213 of the inner ring unit 210a with opposite polarities respectively, and retracted from between the magnetic members 213 of the inner ring unit 210a and the magnetic members 215 of the outer ring unit 210b with the timing when the magnetic members 215 of the outer ring unit 210b come close to the magnetic members 213 of the inner ring unit 210a with the same polarities respectively.

(Operation of Rotation Assistance Mechanism)

Figure 13:
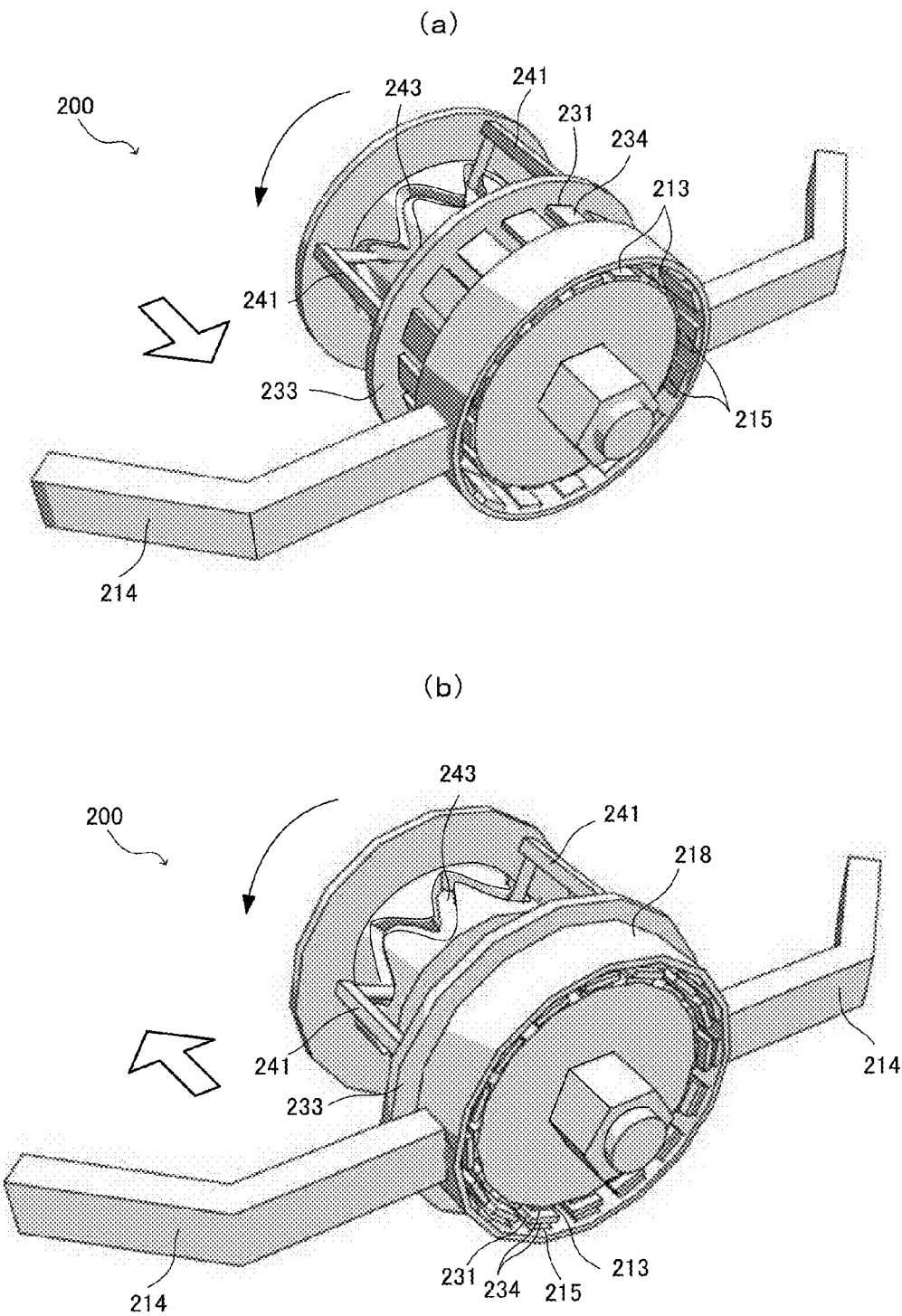
FIG. 13 shows perspective views of the rotation assistance mechanism of the second embodiment before and after operation in accordance with the second embodiment.
Figure 14:
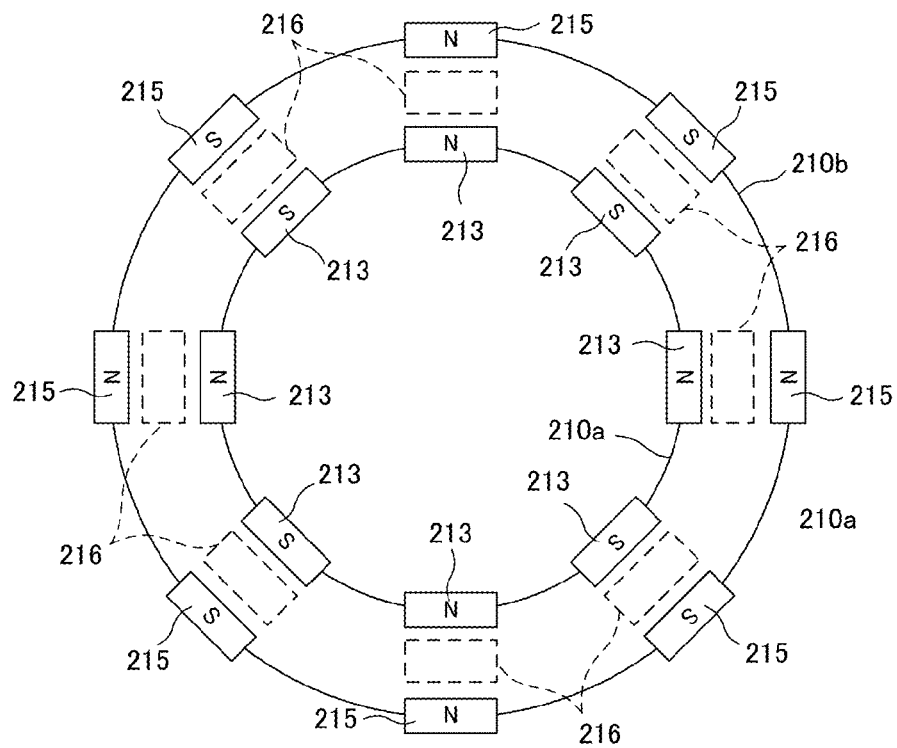
FIG. 14 shows views for explaining the positional relationship of the magnetic members facing each other in accordance with the second embodiment.
Figure 14:
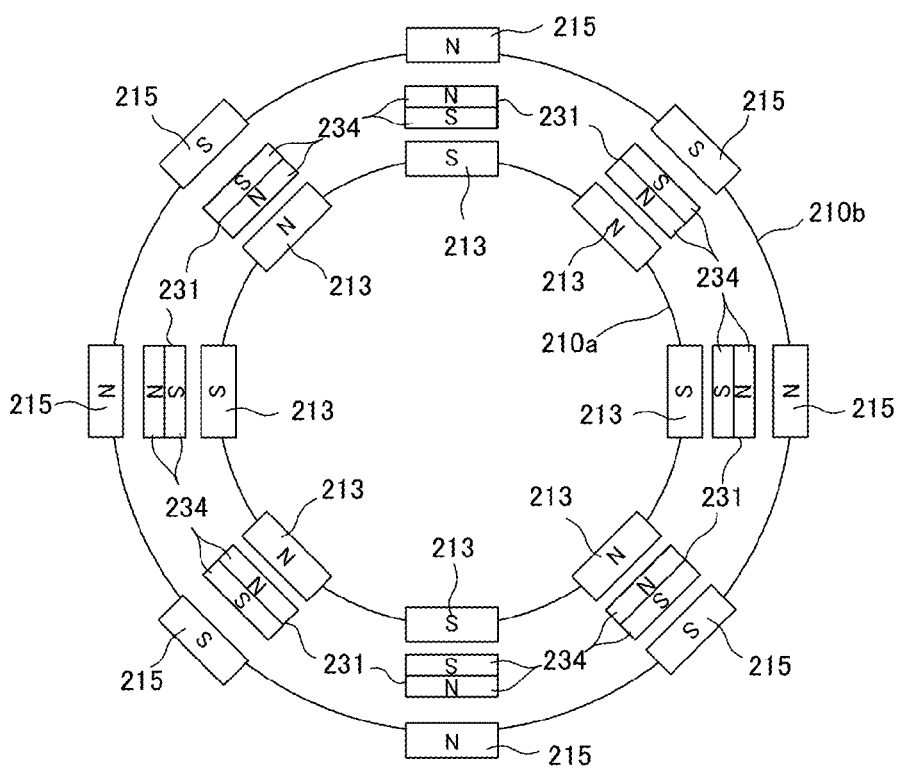

The operation of the rotation assistance mechanism 200 constructed as described above will be explained below. FIG. 13 shows perspective views of the rotation assistance mechanism of the second embodiment before and after operation. FIG. 14 shows views for explaining the positional relationship of the magnetic members facing each other in accordance with the second embodiment.

First, the rear wheel 13 of the bicycle 10 is rotated by turning the pedal 18 of the bicycle 10. The rotation of this rear wheel 13 is transmitted to the shield drive unit 240 and the magnet drive unit 220. When the rear wheel 13 rotates, the wheel unit 212 of the attraction unit 210 connected to the axle 21 of the rear wheel 13 also rotates around the axle 21. This wheel unit 212 is fixed to the axle 21 with the stopper member 250 such as a nut, and rotates to move the magnetic members 213 arranged on the peripheral surface in relation to the outer ring unit 210b. In this case, the housing section 218 of the outer ring unit 210b and the wheel unit 212 of the inner ring unit 210a are mechanically separated from each other so that the rotation force of the wheel unit 212 is not transmitted to the housing section 218.

On the other hand, in synchronization with this rotation, the shield drive unit 240 converts the rotation force of the rotary member 242 to the forward and backward motion of the projection member 231. More specifically, the shield drive unit 240 advances the magnetic surfaces 234 of the projection members 231 between the magnetic members 213 of the inner ring unit 210a and the magnetic members 215 of the outer ring unit 210b with the timing when the magnetic members 215 of the outer ring unit 210b come close to the magnetic members 213 of the inner ring unit 210a with opposite polarities respectively.

First, the rotary member 242 axially supported on the axle 21 rotates in association with the rotation of the rear wheel 13 to advance this projection member 231. Since the rotary member 242 is provided with the guide groove 243 into which the four coupling pins 241 are inserted at symmetric positions with reference to the axle 21, as illustrated in FIG. 13(a), the four coupling pins 241 inserted into this guide groove 243 are guided by the guide groove 243, and therefore the distance to the outer ring unit 210b is widened and narrowed when the rotary member 242 rotates.

Then, when the distance to the outer ring unit 210b is narrowed, the base 233 connected to the four coupling pins 241 is shifted also toward the outer ring unit 210b. As illustrated in FIG. 13(b), the projection members 231 of the shield unit 230 are thereby inserted into the shield apertures 216, and enter between the magnetic member 213 of the inner ring unit 210a and the magnetic member 215 of the outer ring unit 210b.

At this time, as illustrated in FIG. 14(b), the positional relationship between the magnetic member 213 of the inner ring unit 210a and the magnetic member 215 of the outer ring unit 210b is such that the magnetic members 215 of the outer ring unit 210b come close to the magnetic members 213 of the inner ring unit 210a with opposite polarities respectively.

With this timing, therefore, the magnetic surfaces 234 of the projection members 231 are advanced between the magnetic members 213 of the inner ring unit 210a and the magnetic members 215 of the outer ring unit 210b so that the magnetic members 213 and the magnetic members 215 face the magnetic surfaces 234 of the projection members 231 with the same polarities as illustrated in FIG. 14(b) to induce repulsive magnetic forces therebetween.

On the other hand, the shield drive unit 240 retracts the magnetic surfaces 234 of the projection members 231 from between the magnetic members 213 of the inner ring unit 210a and the magnetic members 215 of the outer ring unit 210b with the timing when the magnetic members 215 of the outer ring unit 210b come close to the magnetic members 213 of the inner ring unit 210a with the same polarities respectively.

The retraction motion of the projection members 231 widens the distance to the outer ring unit 210b when the rotary member 242 rotates while the four coupling pins 241 inserted into the guide groove 243 are guided by the guide groove 243 as illustrated in FIG. 13(a). Then, when the distance to the outer ring unit 210b is widened, the shield unit 230 connected to the four coupling pins 241 moves away from the outer ring unit 210b. In this case, as illustrated in FIG. 13(a), the projection members 231 of the shield unit 230 are retracted from the shield apertures 216 to leave the space between the magnetic members 213 of the inner ring unit 210a and the magnetic members 215 of the outer ring unit 210b. At this time, as illustrated in FIG. 14(a), the positional relationship between the magnetic members 213 of the inner ring unit 210a and the magnetic members 215 of the outer ring unit 210b is such that the magnetic members 215 of the outer ring unit 210b come close to the magnetic members 213 of the inner ring unit 210a with the same polarities respectively.

With this timing, therefore, the magnetic surfaces 234 of the projection members 231 are retracted from between the magnetic members 213 of the inner ring unit 210a and the magnetic members 215 of the outer ring unit 210b so that the magnetic members 213 and the magnetic members 215 face each other with the same polarities as illustrated in FIG. 14(a) to induce repulsive magnetic forces therebetween. This operation is continuously repeated in this manner.

(Actions/Effects)

As has been discussed above, since the shield unit 230 of the present embodiment is provided with the plurality of projection members 231 having the magnetic surfaces 234 on the front and back sides thereof respectively, a repulsive magnetic force can be generated by advancing the magnetic surfaces 234 of the projection members 231 between the magnetic members 213 of the inner ring unit 210a and the magnetic members 215 of the outer ring unit 210b with the timing when the magnetic members 215 of the outer ring unit 210b come close to the magnetic members 213 of the inner ring unit 210a with opposite polarities respectively in synchronization with the rotation of the rear wheel 13. Furthermore, an attractive force is generated between the paired magnetic members 213 and 215 with opposite poles facing each other by retracting the magnetic surfaces 234 of the projection members 231 from between the magnetic members 213 of the inner ring unit 210a and the magnetic members 215 of the outer ring unit 210b in the predetermined cycles with the timing when the magnetic members 215 of the outer ring unit 210b come close to the magnetic members 213 of the inner ring unit 210a with the same polarities respectively.

As a result, it is possible to continuously generate the attractive force and the repulsive force by the magnetic members 213 and 215, impart momentum to the rotation of the rear wheel 13, and therefore lessen the pedaling burden. Also, since no electric motor is used, it is possible to reduce the weight and cost of a bicycle. Particularly, in accordance with the present embodiment, a number of magnetic members 213 and 215 are arranged on the cylindrical side surfaces respectively as the attraction unit 210 to generate a stronger attracting force and a repulsive force with the magnetic members.

Third Embodiment

Figure 16:
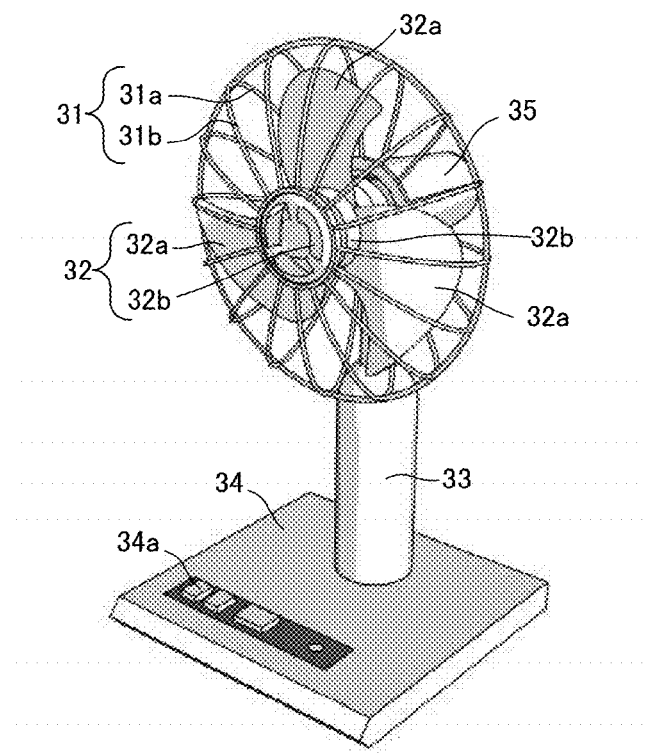
FIG. 16(a) and FIG. 16(b) are perspective views for showing the overall configuration of an electric fan in accordance with a third embodiment.
Figure 16:
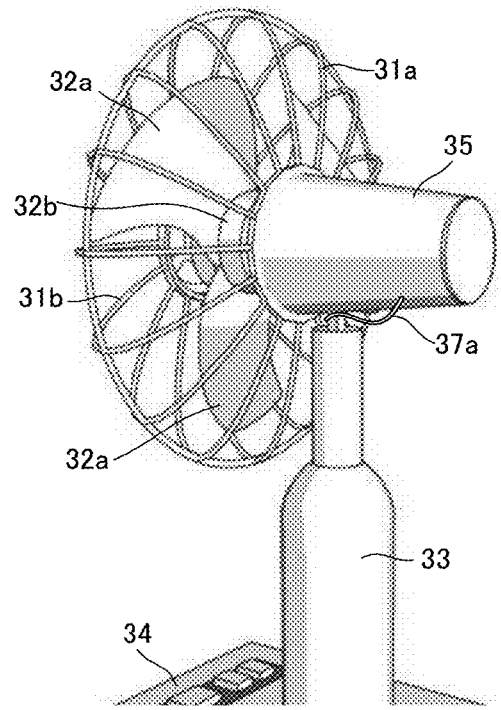
Figure 17:
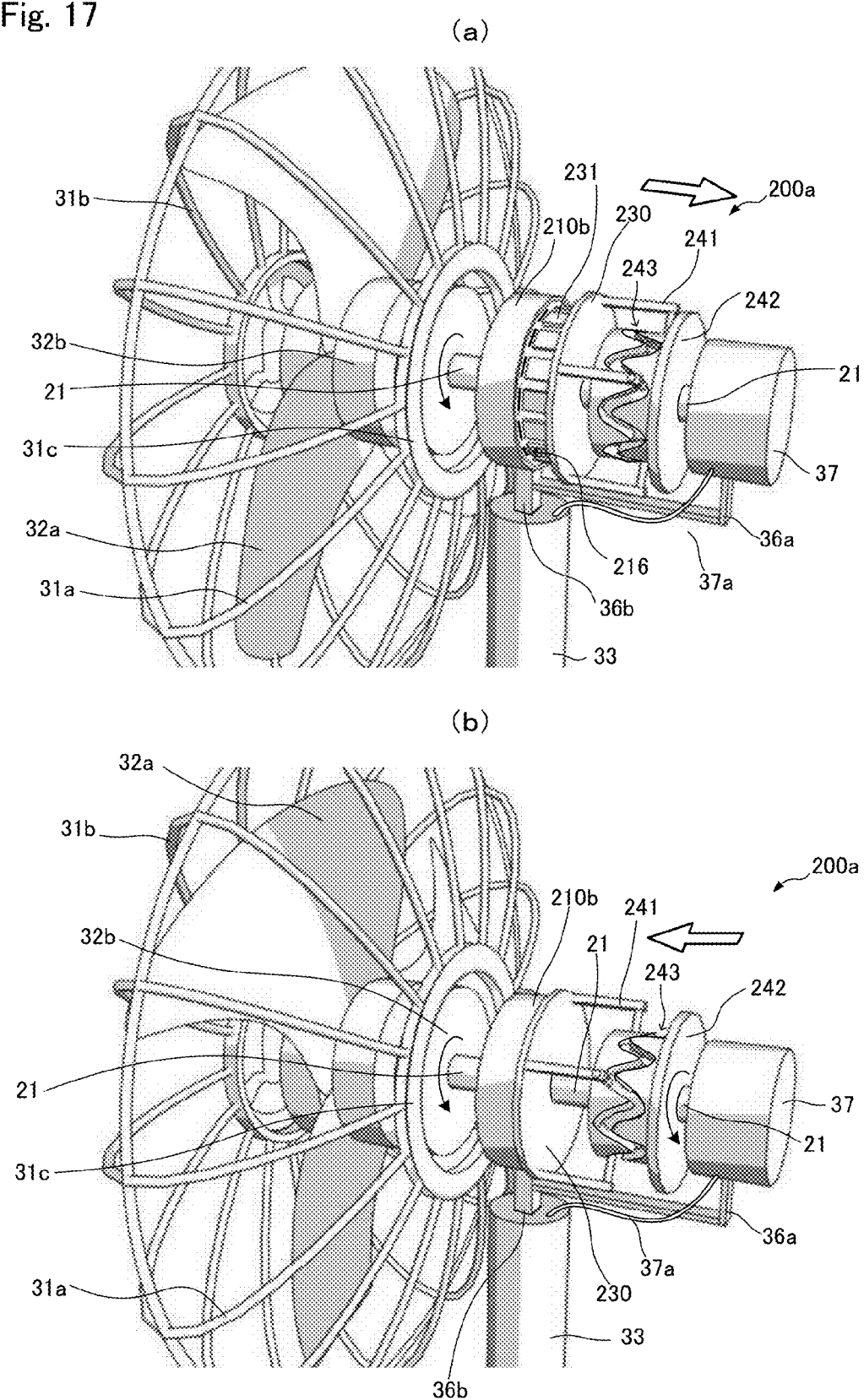
FIG. 17(a) and FIG. 17(b) are perspective views for showing a rotation assistance mechanism of the electric fan in accordance with the third embodiment.

Next, a third embodiment of the present invention will be explained. The present embodiment is directed to a rotating power mechanism which includes the structure of the rotation assistance mechanism in accordance with the second embodiment as described above, and is provided further with a power source which generates a rotational driving force. The rotation assistance mechanism of the present embodiment will be explained here in the case where the present invention is applied to an electric fan as an example which is driven by an electric motor as a power source. FIG. 16(*a*) and FIG. 16(*b*) are perspective views for showing the overall configuration of an electric fan. FIG. 17(*a*) and FIG. 17(*b*) are perspective views for showing a rotation assistance mechanism of the electric fan. Meanwhile, in the description of the present embodiment, like reference numbers indicate functionally similar elements as the above first embodiment unless otherwise specified, and therefore no redundant description is repeated.

As illustrated in FIG. 16(*a*) and FIG. 16(*b*), an electric fan 30 provided with a rotation assistance mechanism 200*a* consists of a base 34 for placing the electric fan 30 on a setting place such as a floor, a support rod 33 erected from the base 34, a motor housing member 35 containing a motor 37 as a power source and the rotation assistance mechanism 200*a*, a blade assembly 32 connected to the rotation axis 21*a* of the motor 37, and a guard 31 mounted on the motor housing member 35 to surround the blade assembly 32.

The base 34 is designed in the form of a plate having a small thickness in the vertical direction to prevent the electric fan 30 from overturning. A manipulation unit 34*a* having manipulation keys and the like is provided on the upper surface of the base 34. Also, the base 34 contains a control unit including a microcomputer and so forth. The control unit controls the operation of the electric fan (for example, by driving the motor 37) in accordance with manipulation of the manipulation unit 34*a*. Alternatively, a so-called remote controller can be used as the manipulation unit 34*a* which can be detached from the base 34.

The support rod 33 is erected from the upper surface of the base 34 and formed to be extensible in the vertical direction. Also, although not shown in the figure, the support rod 33 is provided with a revolving mechanism for revolving the blade assembly 32 in an arbitrary direction. The motor housing member 35 is mounted on the upper end of this support rod 33.

The motor housing member 35 is a cylindrical member having an internal hollow space in which is housed the motor 37 and the rotation assistance mechanism 200*a* of the present invention, and which is made of a synthetic resin such as plastic, a metallic material or the like. As illustrated in FIG. 17(*a*) and FIG. 17(*b*), the rotation axis 21*a* (corresponding to the rotation axis 21 as shown in FIG. 8) of the motor 37 located in the internal hollow space is protruded from the front face of the motor housing member 35, and functions as a linking unit to transmit a driving force generated by the motor 37 to the blade assembly 32. The motor housing member 35 is provided also with a fitting member to which the link member 31*c* of the guard 31 is fitted.

The guard 31 is a basket-like member made of a synthetic resin such as plastic, a metallic material or the like, and consists of a rear fan guard 31*a* which is fitted to the fitting member of the motor housing member 35 with the link member 31*c* for covering the rear side of the blade assembly 32, and a front fan guard 31*b* which is provided for covering the front side of the blade assembly 32. The blade assembly 32 is axially mounted on the rotation axis 21*a*, and consists of a base 32*b* rotatably supported on the rotation axis 21*a*, and a plurality of blades 32*a* which are extending from the side of the base 32*b* in the circumferential direction, such that the plurality of blades rotate by the rotation of the rotation axis 21*a* to generate an air flow.

Next, the motor 37 and the rotation assistance mechanism 200*a* installed in the motor housing member 35 will be explained. As illustrated in FIG. 17(*a*) and Fig. (b), in the case of the present embodiment, the rotation assistance mechanism 200*a* is located between the blade assembly 32 and the motor 37.

The motor 37 is a usual electric machine which can convert electric energy to mechanical energy by receiving electric power from a commercial power supply through a power supply cord 37*a* extending from the base 34, and rotate the rotation axis 21*a* to rotationally drive the blade assembly 32. On the other hand, the motor 37 is electrically connected to the manipulation unit 34*a* of the base 34, and controlled in accordance with the signal transmitted from the manipulation unit 34*a* to start and halt its operation and change the rotation force. Incidentally, as illustrated in FIG. 17, the motor 37 of the present embodiment is supported by a supporting plate 36*a* which is extending from the support rod 33.

The rotation assistance mechanism 200*a* is provided on the rotation axis 21*a* of the motor 37 and serves as a mechanism for imparting momentum to the rotation of the blade assembly 32. In the case of the present embodiment, as illustrated in FIG. 8, the rotation assistance mechanism 200*a* is provided with an attraction unit 210 for giving a rotation force to the blade assembly 32 by the use of the attracting force of a magnet, the rotation axis 21*a* (the rotation axis 21 shown in FIG. 8) as a magnet drive unit for driving the attraction unit 210, a shield unit 230 for strengthening or weakening the attracting force of the attraction unit 210, and a shield drive unit 240 for periodically driving the shield unit 230.

Also, in the case of the present embodiment, the rotation axis 21*a* extending from the motor 37 is passed through the center hole 211 of the inner ring unit 210*a*, the center hole 217 of the outer ring unit 210*b*, the center hole 232 of the shield unit 230 and the center hole of the shield drive unit 240 respectively, and connected to the wheel unit 212 of the inner ring unit 210*a* and the rotary member 242 of the shield drive unit 240 to directly transmit the rotation force of the rotation axis 21*a*. On the other hand, the outer ring unit 210*b* is supported by a supporting plate 36*b* which is extending from the front surface of the support rod 33, and the rotation axis 21*a* rotates in an idling condition as seen from the center hole 217 in order not to transmit the rotation force of the rotation axis 21*a*.

Then, in the case of the present embodiment, while the attraction unit 210 is located in the motor 37 side, the shield drive unit 240 is located in the blade assembly 32 side. Meanwhile, the other structure of the rotation assistance mechanism 200*a* is similar to that of the second embodiment as described above and therefore no redundant description is repeated.

In the rotation assistance mechanism 200*a* having the structure as described above, when the motor 37 rotates the rotation axis 21*a*, the wheel unit 212 connected to the rotation axis 21a of the motor 37 is also rotated together with the rotation axis 21a as the center. This wheel unit 212 is fixed to the rotation axis 21a and rotates to move the magnetic member 213 arranged on the outer surface thereof in relation to the outer ring unit 210b. In this case, the housing section 218 of the outer ring unit 210b and the wheel unit 212 of the inner ring unit 210a are mechanically separated from each other so that the rotation force of the wheel unit 212 is not transmitted to the housing section 218.

On the other hand, in synchronization with this rotation, the shield drive unit 240 converts the rotation force of the rotary member 242 to the forward and backward motion of the projection member 231. More specifically, the shield drive unit 240 advances the magnetic surfaces 234 of the projection members 231 between the magnetic members 213 of the inner ring unit 210a and the magnetic members 215 of the outer ring unit 210b with the timing when the magnetic members 215 of the outer ring unit 210b come close to the magnetic members 213 of the inner ring unit 210a with opposite polarities respectively.

First, the rotary member 242 axially supported on the rotation axis 21a rotates in association with the rotation of the motor 37 to advance this projection member 231. Since the rotary member 242 is provided with the guide groove 243 into which the four coupling pins 241 are inserted at symmetric positions with reference to the rotation axis 21a, as illustrated in FIG. 17(a) and FIG. 17(b), the four coupling pins 241 inserted into this guide groove 243 are guided by the guide groove 243, and therefore the distance to the outer ring unit 210b is widened and narrowed when the rotary member 242 rotates.

Then, as illustrated in FIG. 17(b), when the distance to the outer ring unit 210b is narrowed, the base 233 connected to the four coupling pins 241 is shifted also toward the outer ring unit 210b. As illustrated in FIG. 17(b), the projection members 231 of the shield unit 230 are thereby inserted into the shield apertures 216, and enter between the magnetic member 213 of the inner ring unit 210a and the magnetic member 215 of the outer ring unit 210b.

At this time, as illustrated in FIG. 14(b), the positional relationship between the magnetic member 213 of the inner ring unit 210a and the magnetic member 215 of the outer ring unit 210b is such that the magnetic members 215 of the outer ring unit 210b come close to the magnetic members 213 of the inner ring unit 210a with opposite polarities respectively.

With this timing, therefore, the magnetic surfaces 234 of the projection members 231 are advanced between the magnetic members 213 of the inner ring unit 210a and the magnetic members 215 of the outer ring unit 210b so that the magnetic members 213 and the magnetic members 215 face the magnetic surfaces 234 of the projection members 231 with the same polarities as illustrated in FIG. 14(b) to induce repulsive magnetic forces therebetween.

On the other hand, the shield drive unit 240 retracts the magnetic surfaces 234 of the projection members 231 from between the magnetic members 213 of the inner ring unit 210a and the magnetic members 215 of the outer ring unit 210b with the timing when the magnetic members 215 of the outer ring unit 210b come close to the magnetic members 213 of the inner ring unit 210a with the same polarities respectively.

The retraction motion of the projection members 231 widens the distance to the outer ring unit 210b when the rotary member 242 rotates while the four coupling pins 241 inserted into the guide groove 243 are guided by the guide groove 243 as illustrated in FIG. 17(a).

Then, when the distance to the outer ring unit 210b is widened, the shield unit 230 connected to the four coupling pins 241 moves away from the outer ring unit 210b. In this case, as illustrated in FIG. 17(a), the projection members 231 of the shield unit 230 are retracted from the shield apertures 216 to leave the space between the magnetic members 213 of the inner ring unit 210a and the magnetic members 215 of the outer ring unit 210b.

At this time, as illustrated in FIG. 14(a), the positional relationship between the magnetic members 213 of the inner ring unit 210a and the magnetic members 215 of the outer ring unit 210b is such that the magnetic members 215 of the outer ring unit 210b come close to the magnetic members 213 of the inner ring unit 210a with the same polarities respectively.

With this timing, therefore, when the magnetic surfaces 234 of the projection members 231 are retracted from between the magnetic members 213 of the inner ring unit 210a and the magnetic members 215 of the outer ring unit 210b, the magnetic members 213 and the magnetic members 215 face each other with the same polarities as illustrated in FIG. 14(a) to induce repulsive magnetic forces therebetween. Thereafter, this operation is continuously repeated in this manner.

When electric power is introduced from a power supply in this manner, the rotation assistance mechanism 200a imparts momentum to the rotation axis 21a by an attracting force and a repulsive force as a magnetic action, and imparts momentum also to the blade assembly 32 axially supported on the rotation axis 21a. The rotation of the blade assembly 32 is thereby continued by the operation of the rotation assistance mechanism 200a even when the power supply is stopped. In this case, the rotation of the blade assembly 32 will be gradually decreased and then finally stopped, However, in advance of the blade assembly 32 stops, the rotation of the blade assembly is redumed again by reduming the operation of the rotation assistance mechanism 200a. Thereafter, when the rotation of the blade assembly 32 is restored to a certain extent, the power supply is stopped again. It is possible to maintain the rotation of the blade assembly 32 and save electricity usage by repeating this process.

At this time, in the case of the present embodiment, since the power is turned on before the rotation of the rotation axis 21a and blade assembly 32 is lowered and stopped, the blade assembly 32 can rotate at a constant speed. The control unit performs this control, for example, by turning on/off the power supply at certain intervals, or by providing a sensor which can detect a rotation force and maintaining the rotational speed of the blade assembly 32 with reference to the signal output from the sensor.

(Actions/Effects)

In accordance with the third embodiment as has been discussed above, since the rotation assistance mechanism 200a is provided between the blade assembly 32 and the motor 37 with the rotation axis 21a serving as a link member for transmitting the driving force generated from the motor 37 to the blade assembly 32, when a driving force is transmitted to this rotation axis 21a, the rotation assistance mechanism 200a is operated to continuously generate an attracting force and a repulsive force with the magnetic members and impart momentum to the rotation of the blade assembly 32. It is therefore possible to maintain the rotation force of the blade assembly 32, even when the electric fan 30 is powered off, by the operation of the rotation assistance mechanism 200a, and reduce the power consumption.

Furthermore, in accordance with the present embodiment, it is possible to add variation to the rotation of the rotation axis 21a, for example, in the form of irregularities such as "fluctuations", by generating the attracting force and the repulsive force with the magnetic members 213 and 215. As a result, in accordance with the present embodiment, air flows can be generated with variations in strength.

Fourth Embodiment

Figure 18:
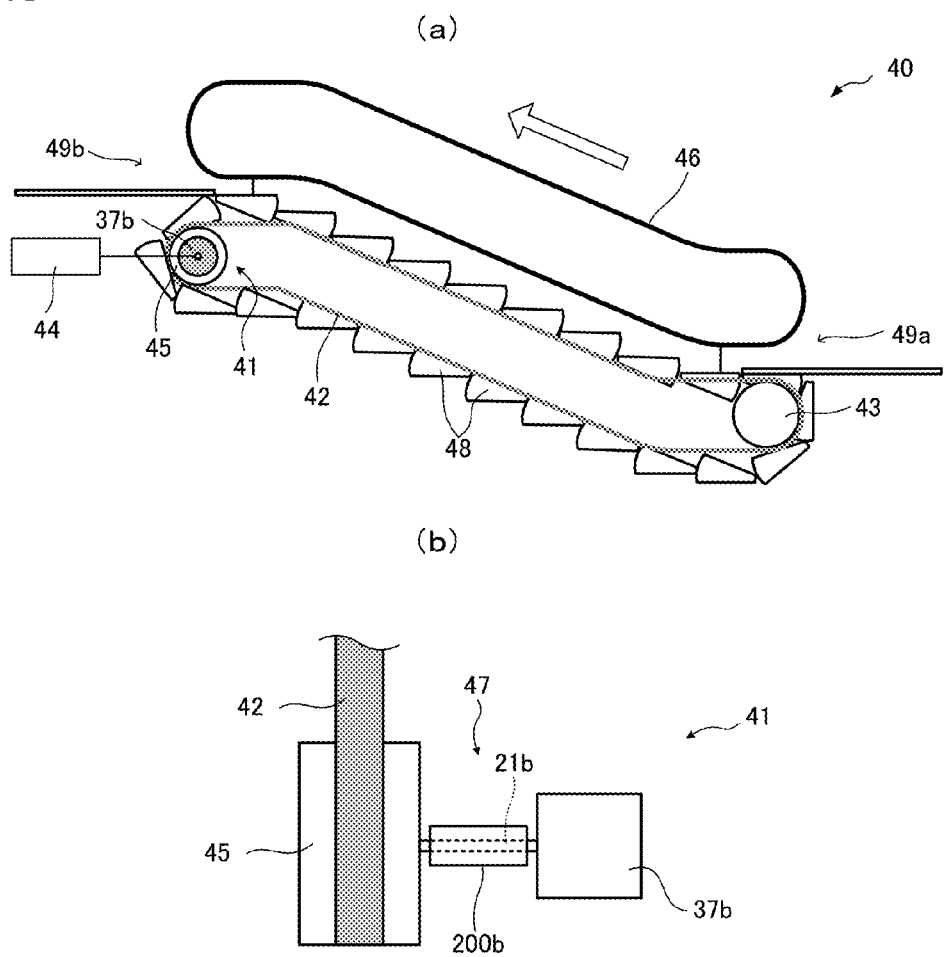
FIG. 18 shows schematic diagrams for showing an escalator in accordance with a fourth embodiment.

Next, a fourth embodiment of the present invention will be explained. The present embodiment will be explained in the case where an escalator is provided with the rotating power mechanism which is explained as the third embodiment. FIG. 18(a) is a schematic diagram for showing a side view of the escalator 40 in accordance with the fourth embodiment. FIG. 18(b) is a schematic diagram for showing a top view of a drive unit in accordance with the fourth embodiment.

The escalator 40 in accordance with the present embodiment includes, as illustrated in FIG. 18(a), moving handrails 46, footboards 48, step chains 42, the drive unit 41 having upper sprockets 45, lower sprockets 43 and a control unit 44.

The moving handrails 46 are parts which persons riding on the escalator 40 hold or grab with hands. The moving handrails 46 are provided in the form of endless loops by connecting opposite ends in the longitudinal direction. The step chains 42 are endless chains wound and spanned between the upper sprocket 45 and the lower sprocket 43, and run around in a loop by the driving force of the drive unit 41.

The lower sprockets 43 are gear wheels and located at the lower entrance section 49a and drive the step chains 42 to circulate the step chains 42 in cooperation with the upper sprockets 45. The footboards 48 have a sufficient size that one or two passenger can ride thereon, and are engaged with and arranged along the step chains 42 in an endless loop to circularly move along the step chains 42. Also, the footboards 48 are step plates having treads for supporting passengers on the upper surfaces thereof. These footboards 48 are circularly driven to horizontally keep the step surfaces during driving the escalator 40. Furthermore, the footboards 48 are provided with a plurality of grooves for slip prevention.

The control unit 44 is an arithmetic processing unit having a microcomputer and so forth. The control unit 44 of the present embodiment has a function to move the footboards 48 of the escalator 40 within a predetermined speed range and halt the motion of the footboards 48 by giving an operation command to the drive unit 41. Also, the control unit 44 can control the escalator 40 to be a descending elevator in which the moving direction of the footboards 48 is from the upper side to the lower side and an ascending elevator in which the moving direction of the footboards 48 is from the lower side to the upper side. Furthermore, the control unit 44 is capable of determining whether or not the moving speed of the footboards 48 falls in the predetermined speed range corresponding to the given command, and whether or not the moving direction of the footboards 48 is that corresponding to the given command. Incidentally, although not shown in the figure, the escalator 40 of the present embodiment is provided with a braking function, a decelerating function, a self-run protection function and so forth.

As illustrated in FIG. 18(b), the drive unit 41 includes the upper sprocket 45, a motor 37b, and a link member 47 for linking the upper sprocket 45 with the motor 37b.

The upper sprocket 45 is a driving gear wheel and located at the upper entrance section 49b to rotate by the rotation force of the motor 37b transmitted through the link member 47 and circulate the step chains 42 in cooperation with the lower sprocket 43.

The motor 37b is a usual electric machine which can convert electric energy to mechanical energy by receiving electric power from a power supply which is not shown in the figure, to rotationally drive the rotation axis 21b which is outwardly protruding.

Furthermore, in the case of the present embodiment, the rotation axis 21b of the motor 37b is connected to the central axis of the upper sprocket 45, and serves as the link member 47 for linking the upper sprocket 45 with the motor 37b. The rotation assistance mechanism 200b is provided on this rotation axis 21b.

The rotation assistance mechanism 200b of the present embodiment has the similar configuration as that of the above third embodiment. Namely, the rotation assistance mechanism 200b is provided with the attraction unit 210 for giving a rotation force to the blade assembly 32 by the use of the attracting force of a magnet, the rotation axis 21a as a magnet drive unit for driving the attraction unit 210, the shield unit 230 for strengthening or weakening the attracting force of the attraction unit 210, and the shield drive unit 240 for periodically driving the shield unit 230.

Then, the rotation axis 21b extending from the motor 37b is passed through the center hole 211 of the inner ring unit 210a, the center hole 217 of the outer ring unit 210b, the center hole 232 of the shield unit 230 and the center hole of the shield drive unit 240 respectively, and connected to the wheel unit 212 of the inner ring unit 210a and the rotary member 242 of the shield drive unit 240 to directly transmit the rotation force of the rotation axis 21b. On the other hand, the outer ring unit 210b is supported by a supporting member which is not shown in the figure, and the rotation axis 21b rotates in an idling condition as seen from the center hole 217 in order not to transmit the rotation force of the rotation axis 21b.

Furthermore, in the case of the present embodiment, while the attraction unit 210 is located in the motor 37b side, the shield drive unit 240 is located in the upper sprocket 45 side. Meanwhile, the other structure and operations of the rotation assistance mechanism 200b are similar to those of the second embodiment and the third embodiment as described above and therefore no redundant description is repeated.

When the escalator 40 as described above is driven by energizing the motor 37b, the rotation assistance mechanism 200b imparts momentum to the rotation axis 21b and transmits the rotation force to the upper sprocket 45 with the momentum. The escalator 40 can be driven as a whole by driving the step chains 42 to circulate with the upper sprocket 45 and the lower sprocket 43 operating in cooperation. The rotational speed of the upper sprockets 45 is maintained constant by repeating the on/off operation of the power supply.

(Actions/Effects)

In accordance with the present embodiment as has been described above, the rotation assistance mechanism 200b is provided between the upper sprocket 45 and the motor 37b with the rotation axis 21b as the link member 47 through which the driving force generated by the motor 37b is transmitted to the upper sprocket 45, and therefore when the driving force is transmitted to this rotation axis 21b, the rotation assistance mechanism 200b is operated to continuously generate an attracting force and a repulsive force with the magnetic members and impart momentum to the rotation of the rotation axis 21b to rotate the upper sprocket 45. Hence, by the same mechanism as the above third embodiment, it is possible to maintain the same rotation force as in conventional techniques only with a small amount of electric power, and thereby reduce the power consumption.

Fifth Embodiment

Figure 19:
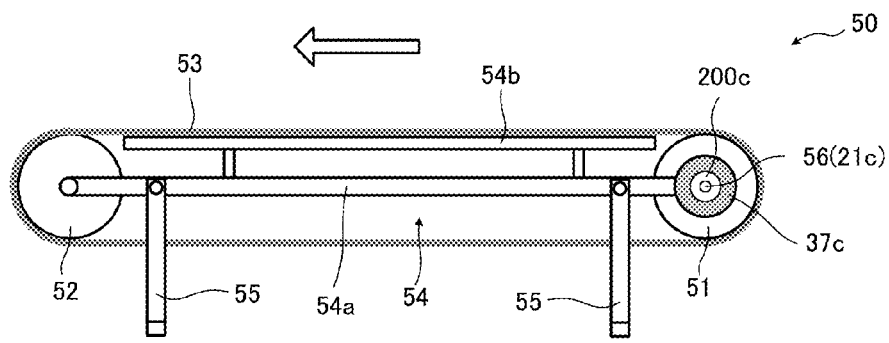
FIG. 19 shows a schematic diagram for showing a belt conveyor in accordance with a fifth embodiment.

Next, a fifth embodiment of the present invention will be explained. The present embodiment will be explained in the case where a belt conveyor is provided with the rotating power mechanism which is explained as the third embodiment. FIG. 19 is a schematic diagram for showing a belt conveyor in accordance with the fourth embodiment.

The belt conveyor 50 of the present embodiment is provided with a drive roller 51, a non-driven roller 52 and a conveyor belt 53 running around the rollers 51 and 52 as an endless belt. The drive roller 51, the non-driven roller 52 and the conveyor belt 53 are supported by a conveyer frame 54.

The conveyer frame 54 is constructed by combining a plurality of framework materials such as round steel tubes, L-shape steels and H-shape steels in the form of a framework structure. The framework materials forming the conveyer frame 54 include, at least, chord materials 54a arranged on both right and left sides of the conveyor belt 53 along the belt running direction of the conveyor belt 53, and cross members which are bridged between the right and left chord materials 54a. The conveyer frame 54 further includes a supporting plate 54b which is supported by the chord materials 54a and supporting the conveyor belt 53 in its upper position from the bottom. The conveyer frame 54 itself is supported by column members 55 which are erected from a floor.

Also, in the case of the present embodiment, the drive roller 51 is connected to a motor 37c through a link member 56 to transmit rotational driving power from the motor 37c to the drive roller 51 through the link member 56 and circularly drive the conveyor belt 53.

The motor 37c is a usual electric machine which can convert electric energy to mechanical energy and rotationally drive a rotation axis 21c, which is outwardly protruding, by receiving electric power from a power supply which is not shown in the figure. Also, this motor 37c is electrically connected to a control unit such as a CPU which is not shown in the figure and controls the start and halt operations, the rotational speed and the like operations of the motor 37c.

In the case of the present embodiment, like the escalator 40 as described above, the rotation axis 21c of the motor 37c is extended along the central axis of the roller 51 and connected to the drive roller 51 as the link member 56 which links the drive roller 51 with the motor 37c through the rotation axis 21c. This rotation axis 21c is provided with the rotation assistance mechanism 200c.

The rotation assistance mechanism 200c of the present embodiment has the similar configuration as the above second and third embodiments. Namely, the rotation assistance mechanism 200c is provided with the attraction unit 210 for giving a rotation force to the blade assembly 32 by the use of the attracting force of a magnet, the rotation axis 21a as a magnet drive unit for driving the attraction unit 210, the shield unit 230 for strengthening or weakening the attracting force of the attraction unit 210, and the shield drive unit 240 for periodically driving the shield unit 230.

Then, the rotation axis 21c extending from the motor 37c is passed through the center hole 211 of the inner ring unit 210a, the center hole 217 of the outer ring unit 210b, the center hole 232 of the shield unit 230 and the center hole of the shield drive unit 240 respectively, and connected to the wheel unit 212 of the inner ring unit 210a and the rotary member 242 of the shield drive unit 240 to directly transmit the rotation force of the rotation axis 21c. On the other hand, the outer ring unit 210b is supported by a supporting member which is not shown in the figure, and the rotation axis 21c rotates in an idling condition as seen from the center hole 217 in order not to transmit the rotation force of the rotation axis 21c.

Furthermore, in the case of the present embodiment, while the attraction unit 210 is located in the motor 37c side, the shield drive unit 240 is located in the roller 51 side. Meanwhile, the other structure and operations of the rotation assistance mechanism 200c are similar to those of the second embodiment and the third embodiment as described above and therefore no redundant description is repeated.

When the belt conveyor 50 as described above is driven by energizing the motor 37c, the rotation assistance mechanism 200c imparts momentum to the rotation axis 21c and transmits the rotation force to the drive roller 51 with the momentum. The belt conveyor 50 can be driven as a whole by driving the conveyor belt 53 to circulate with the drive roller 51 and the non-driven roller 52 operating in cooperation. The rotational speed of the belt conveyor 50 is maintained constant by repeating the on/off operation of the power supply.

(Actions/Effects)

In accordance with the present embodiment as has been described above, the rotation axis 21c is provided as the link member through which the driving force generated by the motor 37c is transmitted to the drive roller 51, and therefore when the driving force is transmitted to this rotation axis 21c, the rotation assistance mechanism 200c is operated to continuously generate an attracting force and a repulsive force with the magnetic members and impart momentum to the rotation of the rotation axis 21c to rotate the drive roller 51. Hence, by the same mechanism as the above third embodiment, it is possible to maintain the same rotation force as in conventional techniques only with a small amount of electric power, and thereby reduce the power consumption.

Sixth Embodiment

Figure 20:
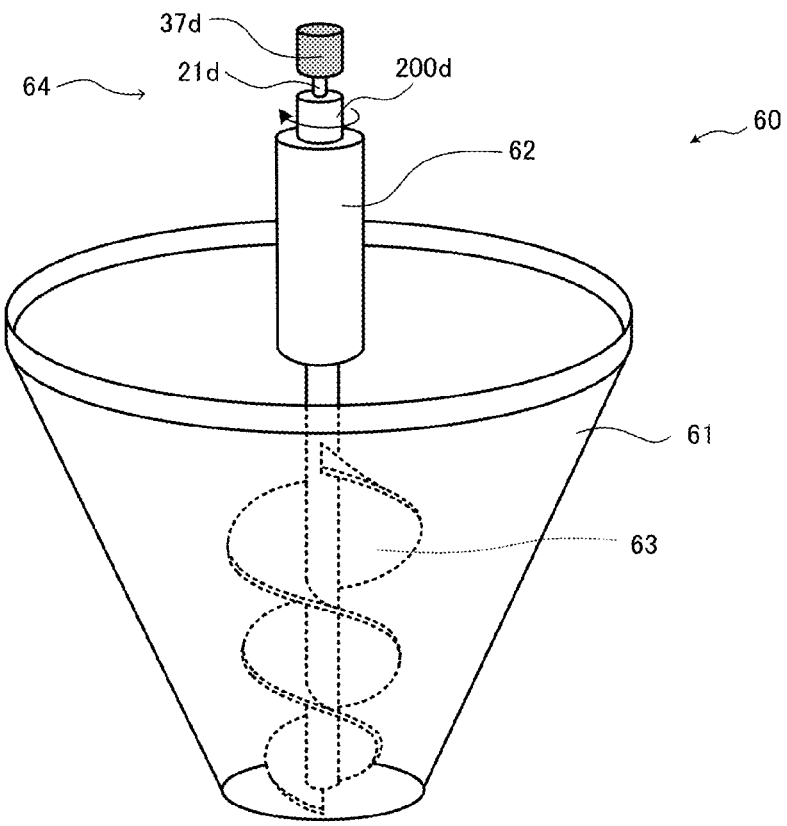
FIG. 20 shows schematic diagrams for showing a kneading machine in accordance with a sixth embodiment.

Next, a sixth embodiment of the present invention will be explained. The present embodiment will be explained in the case where a kneading machine for stirring material to be kneaded is provided with the rotating power mechanism which is explained as the third embodiment. FIG. 20 is a schematic diagram for showing a kneading machine in accordance with the sixth embodiment.

The kneading machine 60 of the present embodiment is provided with a housing 61 in which material to be kneaded is put, a shaft 62 which is rotatably supported in the housing 61 with stirring means 63 such as a paddle, a screw or the like formed on the outer peripheral surface, and a motor 37d for transmitting a driving force to the shaft 62.

In the case of the present embodiment, the housing 61 is a bottomed container that is open at the top, and made of a metal, a synthetic resin, a wood or the like materiel which can be arbitrarily selected. The shaft 62 is extending into the housing 61 from the top opening of the housing 61 to locate the stirring means 63 in the housing 61. On the other hand, the motor 37d is connected to the upper end of the shaft 62 through a link member 64, so that rotational driving power from the motor 37d is transmitted to the shaft 62 through the link member 64 to rotate the stirring means 63 and stir the material to be kneaded in the housing 61.

In the case of the present embodiment, the rotation axis 21d of the motor 37d is connected to the shaft 62, and serves as the link member 64 for linking the shaft 62 with the motor 37d. The rotation assistance mechanism 200d is provided on this rotation axis 21d. Also, this motor 37d is electrically connected to a control unit such as a CPU which is not shown in the figure and controls the start and halt operations, the rotational speed and the like operations of the motor 37d.

The rotation assistance mechanism 200d of the present embodiment has the similar configuration as the above second and third embodiments. Namely, the rotation assistance mechanism 200d is provided with the attraction unit 210 for giving a rotation force to the blade assembly 32 by the use of the attracting force of a magnet, the rotation axis 21a as a magnet drive unit for driving the attraction unit 210, the shield unit 230 for strengthening or weakening the attracting force of the attraction unit 210, and the shield drive unit 240 for periodically driving the shield unit 230.

Then, the rotation axis 21d extending from the motor 37d is passed through the center hole 211 of the inner ring unit 210a, the center hole 217 of the outer ring unit 210b, the center hole 232 of the shield unit 230 and the center hole of the shield drive unit 240 respectively, and connected to the wheel unit 212 of the inner ring unit 210a and the rotary member 242 of the shield drive unit 240 to directly transmit the rotation force of the rotation axis 21d. On the other hand, the outer ring unit 210b is supported by a supporting member which is not shown in the figure, and the rotation axis 21d rotates in an idling condition as seen from the center hole 217 in order not to transmit the rotation force of the rotation axis 21d.

Furthermore, in the case of the present embodiment, while the attraction unit 210 is located in the motor 37d side, the shield drive unit 240 is located in the shaft 62 side. Meanwhile, the other structure and operations of the rotation assistance mechanism 200d are similar to those of the second embodiment and the third embodiment as described above and therefore no redundant description is repeated.

When the kneading machine 60 as described above is driven by energizing the motor 37d, the rotation assistance mechanism 200d imparts momentum to the rotation axis 21d and transmits the rotation force to the shaft 62 with the momentum. The shaft 62 is then rotated to rotate the stirring means 63 and stir the material to be kneaded in the housing 61. The rotational speed of the shaft 62 is maintained constant by repeating the on/off operation of the power supply.

(Actions/Effects)

In accordance with the present embodiment as has been described above, the rotation axis 21d is provided as the link member 64 through which the driving force generated by the motor 37d is transmitted to the stirring means 63, and therefore when the driving force is transmitted to this rotation axis 21d, the rotation assistance mechanism 200d is operated to continuously generate an attracting force and a repulsive force with the magnetic members and impart momentum to the rotation of the rotation axis 21d. Hence, by the same mechanism as the above third embodiment, it is possible to maintain the same rotation force as in conventional techniques only with a small amount of electric power, and thereby reduce the power consumption.

Incidentally, the materials to be kneaded of the present embodiment may be a variety of materials in the form of powders, liquids or the like. Also, the size and configuration of the kneading machine 60 is not limited to those of the present invention but can be arbitrarily selected.

Seventh Embodiment

Figure 21:
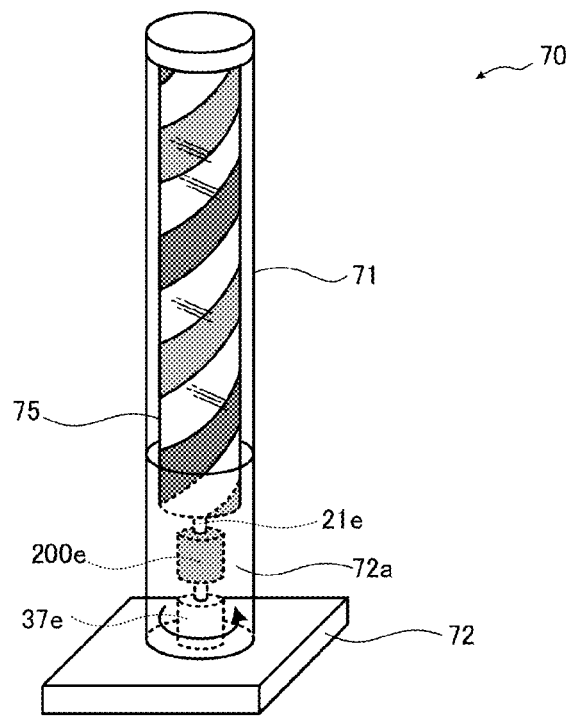
FIG. 21 shows schematic diagrams for showing a sign pole in accordance with a seventh embodiment.

Next, a seventh embodiment of the present invention will be explained. The present embodiment will be explained in the case where the rotating power mechanism which is explained as the third embodiment is applied to a sign pole provided for signifying the place of a barbershop or a beauty parlor by revolving a rotary cylinder located in front of the shop and colored red, blue and white stripes on its outer peripheral surface. FIG. 21 is a schematic diagram for showing a sign pole in accordance with the seventh embodiment.

The sign pole 70 provided with the rotation assistance mechanism 200e according to the present embodiment consists of a base 72 for placing the sign pole 70 on a setting place such as a floor, a transparent external cylinder 71 erected from the upper surface of the base 72, a rotary cylinder 73 which is rotatably supported on the base 72 and capable of rotating in the external cylinder 71.

The external cylinder 71 is a transparent cylindrical member made, for example, of an acrylic resin or the like having waterproofing property. The rotary cylinder 73 is a cylindrical member made of a plastic or the like and having the outer peripheral surface on which are formed stripes colored red, blue and white. This rotary cylinder 73 is made of a semi-transparent material and provided with a lighting lamp which is located therein and turned on to light up the outside by passing the light of the lighting lamp through the rotary cylinder 73. Incidentally, the rotary cylinder 73 may be formed of a rectangular parallelepiped member having a rectangle section, a quadratic section or the like.

The base 72 consists of a flat base plate for preventing the sign pole 70 from overturning, and a housing member 72a containing a motor 37e as a power source and the rotation assistance mechanism 200e and supporting the external cylinder 71 fixed on the top thereof.

The motor 37e is a usual electric machine which can convert electric energy to mechanical energy by receiving electric power from a commercial power supply through a power supply cord (not shown in the figure) which is fixed to the housing member 72a and extending from outside, and rotate the rotation axis 21e to rotationally drive the rotary cylinder 73. On the other hand, the motor 37e is controlled in accordance with the signal transmitted from a control circuit installed in the base 72 to start and halt its operation. Incidentally, in the case of the present embodiment, the motor 37e is supported by the base 72 as illustrated in FIG. 21.

The rotation assistance mechanism 200e is located between the motor 37e and the rotary cylinder 73 and serves as a mechanism for imparting momentum to the rotation of the rotary cylinder 73. The rotation assistance mechanism 200e of the present embodiment has the similar configuration as the above second and third embodiments. Namely, the rotation assistance mechanism 200e is provided on the rotation axis 21e of the motor 37e with the attraction unit 210 for giving a rotation force to the rotary cylinder 73 by the use of the attracting force of a magnet, the rotation axis 21a as a magnet drive unit for driving the attraction unit 210, the shield unit 230 for strengthening or weakening the attracting force of the attraction unit 210, and the shield drive unit 240 for periodically driving the shield unit 230.

Then, the rotation axis 21e extending from the motor 37e is passed through the center hole 211 of the inner ring unit 210a, the center hole 217 of the outer ring unit 210b, the center hole 232 of the shield unit 230 and the center hole of the shield drive unit 240 respectively, and connected to the wheel unit 212 of the inner ring unit 210a and the rotary member 242 of the shield drive unit 240 to directly transmit the rotation force of the rotation axis 21e. On the other hand, the outer ring unit 210b is supported by the base 72, and the rotation axis 21e rotates in an idling condition as seen from the center hole 217 in order not to transmit the rotation force of the rotation axis 21e.

Furthermore, in the case of the present embodiment, while the attraction unit 210 is located in the motor 37e side, the shield drive unit 240 is located in the shaft 62 side. Meanwhile, the other structure and operations of the rotation assistance mechanism 200e are similar to those of the above embodiments, and therefore no redundant description is repeated.

When the sign pole 70 as described above is driven by energizing the motor 37e, the rotation assistance mechanism 200e imparts momentum to the rotation axis 21e and transmits the rotation force to the rotary cylinder 73 with the momentum. Viewers thereby feel as if the stripes colored with red, blue and white are ascending (or descending) while rotating the rotary cylinder 73. The rotation of the rotary cylinder 73 is thereafter maintained by repeating the on/off operation of the power supply.

(Actions/Effects)

In accordance with the present embodiment as has been described above, the rotation assistance mechanism 200e is provided between the motor 37e and the rotary cylinder 73, and the rotation axis 21e is provided as the link member through which the driving force generated by the motor 37e is transmitted to the rotary cylinder 73. Therefore, when the driving force is transmitted to this rotation axis 21e, the rotation assistance mechanism 200e is operated to continuously generate an attracting force and a repulsive force with the magnetic members and impart momentum to the rotation of the rotary cylinder 73. Hence, by the same mechanism as the above third embodiment, it is possible to maintain the same rotation force as in conventional techniques only with a small amount of electric power, and thereby reduce the power consumption.

Furthermore, in accordance with the present embodiment, it is possible to add variation to the rotation of the rotary cylinder 73, for example, in the form of irregularities such as "fluctuations", by generating the attracting force and the repulsive force with the magnetic members 213 and 215. As a result, in accordance with the present embodiment, it is possible to cause irregular changes in the ascending or descending motion of the red, blue and white stripes and enhance a designability.

Eighth Embodiment

Next, an eighth embodiment of the present invention will be explained. The gist of the present embodiment resides in a control scheme which is implemented in the rotation assistance mechanism described above as the third through seventh embodiments, and turns on/off the driving force generation mechanism to generate the rotational driving force intermittently in synchronization with the timing that the magnetic members generate an attracting force or a repulsive force. More specifically, the current supply to the motors 37 to 37e is turned on/off in an intermittent manner with the timing when the magnetic members of the rotation assistance mechanism generate an attracting force or a repulsive force to synchronize with the operation of the shield drive units 140 and 240 of the rotation assistance mechanism.

For example, in the case of the shield drive unit 240 of the second embodiment, the projection member 231 is advanced between the magnetic member 213 of the inner ring unit 210a and the magnetic member 215 of the outer ring unit 210b by supplying current to and rotationally drive the motors 37 to 37e with the timing when the magnetic members 213 of the inner ring unit 210a and the magnetic members 215 of the outer ring unit 210b come close to each other with opposite polarities. On the other hand, the current to the motors 37 to 37e is cut with the timing when a repulsive force is generated by the magnetic members after advancing the projection member 231 between the magnetic member 213 of the inner ring unit 210a and the magnetic member 215 of the outer ring unit 210b, so that the operation can be continued by the repulsive force of the magnetic member and the inertial force of rotating motion.

Also, for example, in the case of the shield drive unit 140 of the first embodiment, the motors 37 to 37e are rotationally driven by supplying current with the timing when an attracting force is generated between the magnetic members 112 and 112 which are paired, and the eccentric rotary plate 132 is advanced between the paired magnetic members 112 and 112. On the other hand, the current to the motors 37 to 37e is cut with the timing when a repulsive force is generated by the magnetic members after advancing the eccentric rotary plate 132 between the paired magnetic members 112 and 112.

In accordance with the present embodiment as has been described above, since the motors 37 to 37e are turned on/off in synchronization with the operation of the shield drive units 140 and 240, the power consumption of the drive motor can be significantly reduced.

Meanwhile, in the case of this example as described above, the motors 37 to 37e are driven when an attracting force is generated between the magnetic members, and the current to the motors 37 to 37e is cut when a repulsive force is generated therebetween. However, the present invention is not limited thereto but applicable as long as the rotationally driving of the motors 37 to 37e is intermittently turned on/off in synchronization with the operation of the shield drive units 140 and 240, and therefore it is possible to drive the motors 37 to 37e when a repulsive force is generated and cut off the current to the motors 37 to 37e when an attracting force is generated.

Furthermore, in the case of the present embodiment, the control unit electronically controls the current supplied to the motors 37 to 37e to turn on/off for rotationally driving the motors 37 to 37e. However, the present invention is not limited thereto but applicable, for example, to the case where current is intermittently supplied to coils through a commutator, a brush and the like (not shown in the figure) installed in the motors 37 to 37e.

Modification Examples

Figure 15:
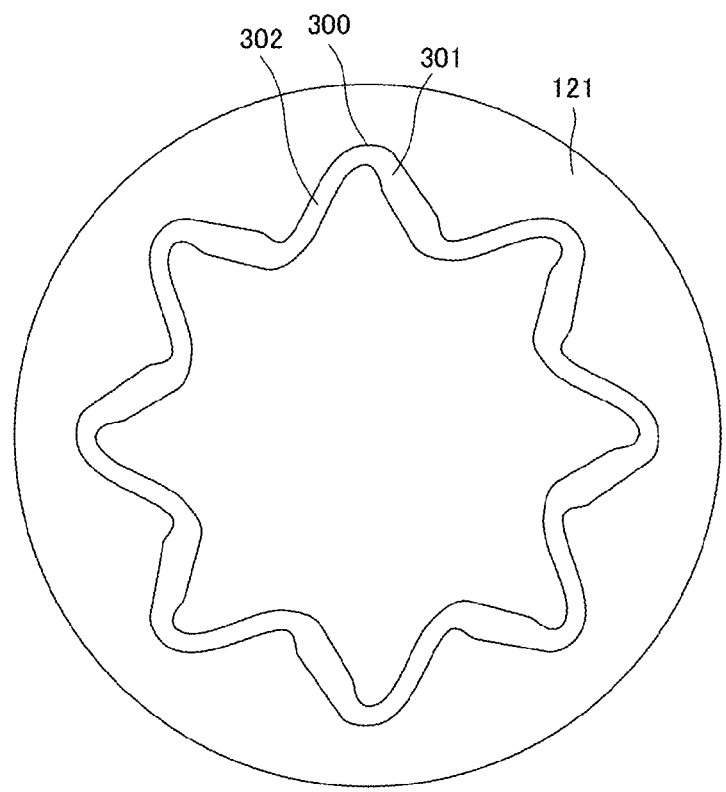
FIG. 15 shows views for explaining groove cams in accordance with modification examples.
Figure 15:
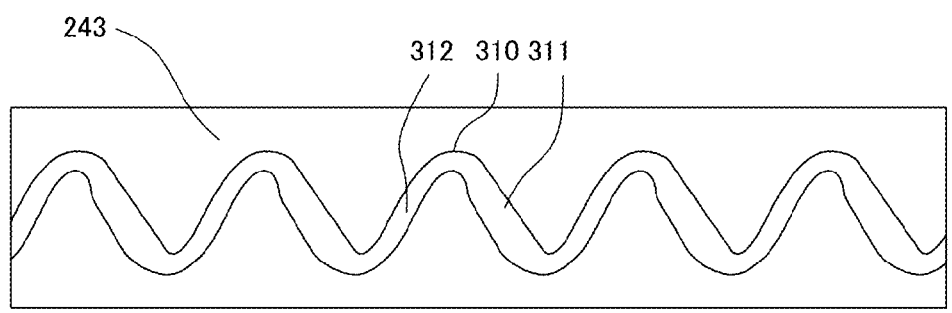

Meanwhile, the present invention is not limited to the above embodiment, but it is possible to add a variety of modification thereto. For example, as illustrated in FIG. 15(a) and FIG. 15(b), the plane groove cam and the cylindrical groove cam into which the coupling pins are inserted can be modified. More specifically, as illustrated in FIG. 15(a) and FIG. 15(b), groove cams 300 and 310 having waveforms which are irregularly continued may be used in place of the groove cams of the first embodiment and the second embodiment which have simple cosine waves respectively. These waveforms behave a cosine waveform with the timing when the pair magnetic members depart from each other, and behave a waveform having a wider groove when the pair magnetic members attract each other. That is, the groove cams are designed such that the guide grooves 301 and 311 have larger widths when the coupling pins are moved by the repulsive force of the magnetic members than the guide grooves 302 and 312 have when the coupling pins are moved by the attracting force of the magnetic members. In this case, the larger width makes it easy to follow the pedaling motion of the user and absorb the resistance of the cam to the varying rotational speed of a wheel.

Also, while the third through sixth embodiments have been explained as examples in which the rotation assistance mechanism of the present invention is applied to the apparatuses having the motors 37 to 37e, the present invention is not limited thereto, but applicable also to any other apparatuses having a variety of electric motors, for example, assist bicycles, automobiles, trains, electric power tools such as drills, and home electric appliances such as driers, CD/DVD players and so forth. Furthermore, while the rotation assistance mechanism of the second embodiment is applied to the third through sixth embodiments in the above examples, the rotation assistance mechanism of the first embodiment can be applied instead.

EXPLANATION OF SYMBOLS

1 . . . body frame
2 . . . head tube
3 . . . down tube
4 . . . rear fork
5 . . . seat post
6 . . . front fork
7 . . . front wheel
8 . . . handlebar
9 . . . rear end
10 . . . bicycle
11 . . . chain
12 . . . stay
13 . . . rear wheel
14 . . . crank shaft
15 . . . seat
16 . . . support shaft
17 . . . crank
18 . . . pedal
19 . . . driving sprocket
20 . . . non-driven sprocket
21, 21a to 21e . . . axle
22 . . . hub
37, 37b to 37e . . . motor
40 . . . escalator
41 . . . drive unit
42 . . . step chain
43 . . . lower sprocket
44 . . . control unit
45 . . . upper sprocket
46 . . . moving handrail
47 . . . link member
48 . . . footboard
49a . . . entrance section
49b . . . entrance section
50 . . . belt conveyor
51 . . . roller
51 . . . drive roller
52 . . . non-driven roller
53 . . . transfer belt
54 . . . conveyer frame
54a . . . chord material
54b . . . supporting plate
55 . . . column member
56 . . . link member
60 . . . kneading machine
61 . . . housing
62 . . . shaft
63 . . . stirring means
64 . . . link member
70 . . . sign pole
71 . . . external cylinder
72 . . . base
72a . . . housing member
73 . . . rotary cylinder
100 . . . rotation assistance mechanism
110 . . . attraction unit
111, 111 . . . arm member
112, 112 . . . magnetic member
112a, 112a . . . opposite surface
113 . . . resilient member
115 . . . rotating shaft
120 . . . magnet drive unit
121 . . . rotary member
122 . . . plane groove cam
122a . . . guide groove
123, 123 . . . coupling pin
130 . . . shield unit
131 . . . rotation axis
132 . . . eccentric rotary plate
133, 133 . . . magnetic surface
140 . . . shield drive unit
141 . . . gear
141 to 144 . . . gear unit
142 . . . shaft
143, 144 . . . bevel gear
200, 200a to 200e . . . rotation assistance mechanism
210 . . . attraction unit
210a . . . inner ring unit
210b . . . outer ring unit
211 . . . center hole
212 . . . wheel unit
213, 215 . . . magnetic member
214 . . . frame member
215 . . . magnetic member
216 . . . shield aperture
218 . . . housing section
220 . . . magnet drive unit
221 . . . wheel unit
230 . . . shield unit
231 . . . projection member
217, 232 . . . center hole
233 . . . base
234 . . . magnetic surface
240 . . . shield drive unit
240a . . . flange
241 . . . coupling pin
242 . . . rotaty member
243 . . . guide groove
250 . . . stopper member
252 . . . indent section
300, 310 . . . grooved cam

The invention claimed is:

1. A rotation assistance mechanism for imparting momentum to the rotation of an axle around a rotation axis, comprising:
an attraction unit including a pair of magnetic members, the pair of magnet members located with opposite poles facing each other;
a magnet drive unit configured to change a distance between the pair of magnetic members in one or more predetermined cycles by a rotation of an axle around a rotation axis;
a shield unit provided to be advanced to and retracted from between the pair of magnetic members facing each other; and
a shield drive unit configured to advance the shield unit to between the pair of magnetic members in the one or more predetermined cycles when the distance between the pair of magnetic members is contracted, and retract the shield unit from between the pair of magnetic members in the one or more predetermined cycles when the distance between the pair of magnetic members is expanded, wherein the shield unit has a pair of magnetic surfaces facing the pair of magnetic members respectively, the pair of magnetic surfaces having magnetic polarities opposite to those of the corresponding surfaces of the pair of magnetic members respectively.

2. The rotation assistance mechanism of claim 1, wherein the attraction unit is provided with a pair of arm members which support the pair of magnetic members respectively, the pair of arm members relatively pivot in order to widen and narrow a distance therebetween, the magnet drive unit comprising:

a rotary member configured to rotate together with the axle;

a plane groove cam formed with a guide groove which is carved on a surface of the rotary member; and a pair of coupling pins projected to the rotary member from the arm members respectively, the pair of coupling pins guided by the guide groove to widen and narrow the distance between the arm members, wherein the shield unit has an eccentric rotary plate, the eccentric rotary plate is rotated around a decentered rotation axis, the pair of magnetic surfaces are provided on respective front and back sides of the eccentric rotary plate, wherein the shield drive unit has a gear unit which converts a rotation force of the rotary member to the rotation of the eccentric rotary plate, and wherein the shield drive unit advances the magnetic surfaces of the eccentric rotary plate to between the pair of magnetic members in the one or more predetermined cycles when the distance between the pair of arm members is contracted, and retracts the magnetic surfaces of the eccentric rotary plate from between the pair of magnetic members in the one or more predetermined cycles when the distance between the pair of arm members is expanded.

3. The rotation assistance mechanism of claim 1, wherein the attraction unit comprises:

an inner ring unit in the form of a cylinder which rotates together with the rotation of the axle, the inner ring provided with a plurality of magnetic members arranged on an outer surface; and an outer ring unit in the form of a cylinder which is fitted inside the inner ring unit, the outer ring unit provided with a plurality of magnetic members arranged on an inner surface, wherein the magnet drive unit includes a rotary member which rotates together with the axle so that the inner ring unit is rotated in relation to the outer ring unit by the rotation of the axle, wherein the shield unit is provided with a plurality of projection members, the plurality of projection members each having magnetic surfaces on respective front and back sides thereof, and the shield unit moves the plurality of projection members forward and backward between the outer surface of the inner ring unit and the inner surface of the outer ring unit, wherein the shield drive unit includes a cylindrical groove cam which converts a rotation force of the rotary member to the forward and backward motion of the plurality of projection members, and wherein the shield drive unit advances the magnetic surfaces of the projection members between the magnetic members of the inner ring unit and the magnetic members of the outer ring unit when the magnetic members of the outer ring unit come close to the magnetic members of the inner ring unit with opposite polarities respectively, and retracts the magnetic surfaces of the projection members from between the magnetic members of the inner ring unit and the magnetic members of the outer ring unit when the magnetic members of the outer ring unit come close to the magnetic members of the inner ring unit with the same polarities respectively.

4. The rotation assistance mechanisms recited in claim 1, further comprising a wheel for a bicycle which is rotationally driven by a driving force transmitted from the axle which is supported on a body frame of the bicycle.

\* \* \* \* \*